US012587055B2

(12) United States Patent
Kalb et al.

(10) Patent No.: US 12,587,055 B2
(45) Date of Patent: Mar. 24, 2026

(54) DRIVE DEVICE HAVING A BRUSHLESS ELECTRIC MOTOR

(71) Applicant: Brose Fahrzeugteile SE & Co. Kommanditgesellschaft, Bamberg, Bamberg (DE)

(72) Inventors: Roland Kalb, Rossach (DE); Gabriele Lange, Marktrodach (DE); Wolfgang Strauss, Unterpleichfeld (DE); Stefan Wüst, Lohr am Main (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 207 days.

(21) Appl. No.: 18/502,251

(22) Filed: Nov. 6, 2023

(65) Prior Publication Data

US 2024/0072597 A1     Feb. 29, 2024

Related U.S. Application Data

(63) Continuation of application No. PCT/EP2022/060817, filed on Apr. 25, 2022.

(30) Foreign Application Priority Data

May 5, 2021     (DE) ..................... 10 2021 204 545.6
Oct. 20, 2021     (DE) ..................... 10 2021 211 846.1

(51) Int. Cl.
*H02K 3/52*          (2006.01)
*E05F 15/697*          (2015.01)
          (Continued)

(52) U.S. Cl.
CPC ........... *H02K 3/522* (2013.01); *E05F 15/697* (2015.01); *H02K 7/1166* (2013.01); *H02K 11/33* (2016.01);
          (Continued)

(58) Field of Classification Search
CPC .......... H02K 3/522; H02K 3/521; H02K 3/46; H02K 3/52; H02K 11/33; H02K 11/30;
          (Continued)

(56) References Cited

U.S. PATENT DOCUMENTS 6,211,631 B1     4/2001   Wilson-Jones et al.
9,197,108 B2     11/2015   Schweichart et al.
          (Continued)

FOREIGN PATENT DOCUMENTS

CN          105958693 A     9/2016
CN          207117422 U     3/2018
          (Continued)

OTHER PUBLICATIONS

Machine Translation of WO 2020135132 A1 (Year: 2020).*
Machine Translation of DE 102019203525 A1 (Year: 2020).*

*Primary Examiner* — Alexander A Singh
*Assistant Examiner* — Charlie Frank Mann, Jr.
(74) *Attorney, Agent, or Firm* — Laurence A. Greenberg; Werner H. Stemer; Ralph E. Locher

(57)          ABSTRACT

A drive device contains a brushless electric motor having a rotor with a rotor shaft coupled to the rotor, and a stator which has a stator support and a rotating field winding or stator winding with a number of phase connection wires. A gear mechanism housing is provided and has an electronics compartment with a printed circuit board which is accommodated in the compartment and has connection points for the phase connection wires. A housing shaft is provided which is coaxial with respect to the axis of rotation of the rotor shaft and in which the stator is accommodated together with the stator support and the rotor is accommodated together with the rotor shaft. A connection adapter is provided in which the phase connection wires are oriented radially and are accommodated in a connection grid which (Continued)

is adapted to the connection points of the printed circuit board.

17 Claims, 14 Drawing Sheets

(51) Int. Cl.
*H02K 7/116*       (2006.01)
*H02K 11/33*      (2016.01)

(52) U.S. Cl.
CPC ....... *E05Y 2900/55* (2013.01); *H02K 2211/03* (2013.01)

(58) Field of Classification Search
CPC ........ H02K 11/00; H02K 3/00; H02K 7/1166; H02K 7/1163; H02K 2211/03; H02K 1/18; H02K 7/116
See application file for complete search history.

(56)             References Cited

U.S. PATENT DOCUMENTS

| | | |
|---|---|---|
| 9,722,469 B2 | 8/2017 | Schweichart et al. |
| 12,438,406 B2 | 10/2025 | Lange et al. |

| | | | | |
|---|---|---|---|---|
| 2012/0126656 A1 | 5/2012 | Gerard et al. | | |
| 2014/0210288 A1 | 7/2014 | Park et al. | | |
| 2017/0203722 A1 | 7/2017 | Shoda et al. | | |
| 2017/0366070 A1* | 12/2017 | Iso | ........................ | H02K 7/1166 |
| 2019/0277079 A1* | 9/2019 | Lange | .................... | E05F 15/697 |
| 2021/0013782 A1* | 1/2021 | Kobayashi | ............ | F04B 39/121 |
| 2022/0149696 A1 | 5/2022 | Kalb et al. | | |
| 2022/0190692 A1 | 6/2022 | Christian et al. | | |

FOREIGN PATENT DOCUMENTS

| | | | | |
|---|---|---|---|---|
| CN | 113541364 A | 10/2021 | | |
| DE | 155800 A3 | 7/1982 | | |
| DE | 69712595 T2 | 8/2002 | | |
| DE | 102011119022 A1 | 5/2012 | | |
| DE | 102011121716 B3 | 2/2013 | | |
| DE | 102013207384 A1 | 10/2014 | | |
| DE | 102018103930 A1 | 8/2019 | | |
| DE | 102019203525 A1 * | 9/2020 | ............. | H02K 11/38 |
| DE | 102020209500 A1 | 2/2022 | | |
| WO | WO-2020135132 A1 * | 7/2020 | ........... | H02G 15/007 |
| WO | 2020207946 A1 | 10/2020 | | |

* cited by examiner

DRIVE DEVICE HAVING A BRUSHLESS ELECTRIC MOTOR

CROSS-REFERENCE TO RELATED APPLICATION

This application is a continuation, under 35 U.S.C. § 120, of copending International Patent Application PCT/EP2022/060817, filed Apr. 25, 2022, which designated the United States; this application also claims the priority, under 35 U.S.C. § 119, of German Patent Application DE 10 2021 204 545.6, filed May 5, 2021, and DE 10 2021 211 846.1, filed Oct. 20, 2021; the prior applications are herewith incorporated by reference in their entirety.

FIELD AND BACKGROUND OF THE INVENTION

The invention relates to a drive apparatus, in particular an electromotive adjusting drive, preferably a (cable type) window lifting mechanism, of a motor vehicle.

A drive apparatus, which drives, for example, as an electromotive adjusting drive of a motor vehicle, an adjusting element, in particular a windowpane of a vehicle side door, between two end positions along an adjusting path, generally contains an electric motor and a gear mechanism which is coupled thereto and which is arranged in a gear mechanism housing. The gear mechanism housing is connected to a motor housing, which receives the stator and the rotor of the electric motor, for example, via a flange-like connection, wherein the electric motor may typically be an (internal rotor) commutator motor with brushes or also a brushless external rotor motor. Such drive apparatuses, in particular window lifting drives, are exposed at the correct installation location under some circumstances to extreme moisture and high temperature fluctuations.

If a brushless, electronically commutated electric motor, the stator of which has a multi-phase, generally three-phase stator or rotary current winding, is used for such a drive apparatus, the phase connections are intended to be contacted with an electronic motor unit which supplies electric power to the rotary current winding. The electrical connection of the phase connections with respect to the electronic motor unit can be carried out within the drive apparatus at a printed circuit board, on which the electric and/or electronic components of the electronic motor unit are mounted and connected to each other. Alternatively, the electrical connection of the phase connections can also be carried out by means of a plug type connection (plug contacting) with an electronic motor unit which is provided outside the drive apparatus.

A drive apparatus which is known from German patent DE 10 2011 121 716 B3, corresponding to U.S. Pat. Nos. 9,197,108 and 9,722,469, for adjusting a covering element of a vehicle, in particular for a window lifting mechanism, contains an output element for adjusting the vehicle component and a brushless, electronically commutated electric motor having a stator, a rotor and a drive shaft which is connected thereto (motor or rotor shaft) for driving the output element. The rotor is in the form of an external rotor which rotates radially relative to the shaft axle outside the stator. The stator base member, which is, for example, in the form of a metal sheet assembly and which receives the stator winding, of the stator can be placed on a bush-like or tubular hollow-cylindrical stator carrier, through which the drive shaft which carries the rotor is or becomes guided into the gear mechanism housing.

The phase or winding wires of the stator winding (rotary field winding) can be manually bundled and fixed with additional auxiliary means, for example, with an adhesive film or a cable tie, at a desired position. However, it is desirable to have the possibility of an automated process for the bundling and fixing or the pre-fixing of the phase connections or wires of the stator winding.

In a drive apparatus known from published, non-prosecuted German patent application DE 10 2019 203 525 A1, corresponding to U.S. patent publication No. 2022/0190692, slots are intended to be provided in the printed circuit board of the electronic motor or control unit in order to be able to insert the phase wires at or in the printed circuit board in a positionally accurate manner. When the printed circuit board is inserted in an associated electronic compartment of the gear mechanism housing and the phase connection wires are subsequently inserted into the printed circuit board slots, however, such a process typically requires two movement axes or planes for assembling the printed circuit board or subassembly.

In an automated process, it is necessary for the stator including the stator winding or the subassembly containing the stator and rotor including the motor or rotor shaft (stator/rotor subassembly) to be orientated as precisely as possible before insertion into the gear mechanism housing so that the phase or winding wires (phase start and phase end wires) and the stator carrier (the stator bush) can be mounted with the gear mechanism housing in a reliable and failsafe manner.

SUMMARY OF THE INVENTION

An object of the invention is to provide a drive apparatus with an improved concept for the phase connections of a brushless electric motor.

This object is achieved according to the invention by the features of the independent claim. The dependent claims relate to advantageous further developments and configurations.

The drive apparatus, in particular of an electromotive adjusting drive of a motor vehicle, has a brushless electric motor having a rotor having a rotor shaft which is connected thereto and having a stator which contains a stator base member which is placed on a tubular or cylindrical stator carrier (stator bush) and which has a number of stator teeth which are arranged in a tooth-like manner. The stator or a (pressed on) stator base member which is placed on the stator carrier (in a positive-locking and/or non-positive-locking manner) is provided with a stator winding (rotary field winding) having a number of phase connection wires which can extend partially axially and/or in a circumferential direction (azimuthal) with respect to the shaft or rotation axis of the rotor shaft. To this end, the stator winding can be formed from a number of individual or double or multiple coils, the coil ends of which are connected to each other, for example, in a star-like or triangular circuit, and form the phase connections as connection wires, via which the current supply (which is in-phase or out-of-phase) of the stator winding is carried out.

The drive apparatus has a gear mechanism housing having an electronic compartment and having a housing shaft which is coaxial relative to the rotation axis (shaft axis) of the rotor shaft. A printed circuit board with connection locations for the phase connection wires is received or can be introduced into the electronic compartment. The electric motor or the stator/rotor subassembly with the rotor shaft and with the stator carrier is received or can be inserted in the preferably hollow-cylindrical housing shaft. To this end, the gear mechanism housing has a housing opening which opens in the housing shaft and via which the subassembly containing the rotor and rotor shaft and stator with stator carrier and stator or rotary field winding is inserted into the gear mechanism housing. In this case, the rotor or motor shaft advantageously already carries a worm which meshes in the assembled state with a worm gear, which is rotatably supported in the gear mechanism housing, of a 90° redirecting gear mechanism (worm gear mechanism).

The drive apparatus further has a connection adapter with or in which the phase connection wires are orientated radially. In the connection adapter, the phase connection wires are further received in a connection grid which is adapted to the connection locations of the printed circuit board. In a particularly advantageous manner, the phase connection wires are radially orientated by means of the connection adapter and orientated in a line which extends tangentially to the rotor shaft. In other words, the connection adapter has a number of wire openings which are arranged in a connection grid which is orientated tangentially and which is radially spaced apart from the stator carrier. This complies with or corresponds to the line or plane of the associated connection locations of the printed circuit board. It is also possible for the connection adapter to have a number, particularly a number corresponding to the number of phase connection wires, of slot-like wire openings which are arranged along a circular arc with a central angle between 100° and 180°, preferably with a central angle of (130±15°). In a suitable manner, they are configured as or in the form of axial grooves. The connection adapter is preferably a plastics component.

Consequently, the connection adapter makes it possible for the printed circuit board to be able to be inserted into the electronic compartment perpendicularly (radially) relative to the rotor shaft in only one plane or axis in an automated process, wherein the phase connection wires automatically slide or are inserted into the connection locations of the printed circuit board. In a particularly advantageous manner, therefore, the connection locations on the printed circuit board can be in the form of easy-to-produce holes, which may also be tin-plated, for example. The connection adapter has a number, corresponding to the number of phase connection wires, of circumferentially closed wire openings, which are therefore in the form of holes. Instead of the holes, slots which are open wire openings in a suitable manner in the direction toward the stator carrier may also be provided.

In an advantageous embodiment, the connection adapter has at least one joining element which is also referred to below simply as an assembly peg and which corresponds to a joining opening in the gear mechanism housing, preferably in the region of a transition between the electronic compartment or the compartment base thereof and the housing shaft. By means of the joining element, the connection adapter is fixed, in particular in a positionally accurate manner in a desired position, during assembly in a positive-locking and/or non-positive-locking manner in the gear mechanism housing. In one embodiment, the connection adapter has two axially orientated joining element or studs.

In one variant, an individual assembly peg is formed in the form of a joining element via at least one desired breaking location in the form of severable or tearable webs or ribs in an adapter opening at the periphery. In the assembled state of the connection adapter in the gear mechanism housing in the region of a transition between the electronic compartment or the compartment base thereof and the housing shaft, the assembly peg corresponds to a joining opening which opens in the housing shaft of the gear mechanism housing. By pressing the assembly peg on the adapter into the joining opening in the housing, the assembly peg tears at the desired breaking locations and a joining connection of the connection adapter to the gear mechanism housing is produced. In a suitable manner, the assembly peg has a number of radial ribs or flaps so that during the pressing of the assembly peg into the joining opening in the housing a positive-locking and non-positive-locking connection is produced in the manner of a press-fit.

An advantageous further development makes provision for the connection adapter to have radially orientated caulking knobs for fixing the printed circuit board and/or for at least one caulking knob for fixing the printed circuit board to be provided in the electronic compartment of the gear mechanism housing. The caulking knobs can be deformed in a suitable manner (in the hot or cold state).

In a particularly advantageous manner, the stator or the stator base member thereof which is preferably in the form of a metal sheet assembly (which is stamped and bundled) has an electrically insulating coil or winding member for the stator winding which is formed in particular from individual, double or multiple coils. This winding member for the coils of the stator winding is formed in a suitable manner from two half-shell-like grooved box insulations which engage round or over, at least partially or in sections, the stator teeth, which extend in a star-like manner, of the stator base member. At least one of the grooved box insulations which is placed on the stator base member has a collar-like cap portion which engages round the stator carrier. This collar-like cap portion preferably has radially orientated contours so as to form radial grooves which extend axially or at an acute angle relative to the axial direction and in which the individual phase connection wires are located in sections.

According to an advantageous embodiment, the connection adapter has an annular portion which engages partially or completely round the stator carrier. It is formed on the connection adapter which is preferably produced from plastics material in such a manner that the adapter base member which has the wire openings for the phase connection wires is placed so as to extend tangentially on the annular portion. In a particularly preferable manner, the connection adapter has an annular portion which partially or completely engages round the collar-like cap portion of the grooved box insulation. The annular portion or ring of the connection adapter is advantageously used to orientate the (radial) height of the phase connection wires which are advantageously clamped in the connection adapter relative to the center axis of the stator carrier (the stator bush) or the rotation axis of the motor shaft or rotor shaft.

Particularly in the variant of the connection adapter with a closed annular portion, it has a joining contour which corresponds to a joining groove of the cap portion of the grooved box insulation so as to produce a positive-locking connection. Alternatively, it has, preferably in a variant of the connection adapter with a partially closed annular portion, two curved or substantially quarter-circle-like locking arms with end locking elements which in the assembled state engage behind corresponding locking contours on the cap portion of the grooved box insulation, in particular in a positive-locking manner.

The term "positive-locking fit" or a "positive-locking connection" between at least two mutually connected members is intended to be understood here and below particularly in that the retention of the mutually connected members is carried out in at least one direction by direct engagement of contours of the members themselves in each other or by indirect engagement via an additional connection component. The "blocking" of a mutual movement in this direction is therefore carried out by the shape.

A connection adapter in the form of a clamping ring which is or can be placed on the stator carrier has in a suitable manner a number, which corresponds to the number of phase connection wires, of recesses via which the phase connection wires are guided. The clamping ring can be pushed axially onto the stator carrier, wherein the phase connection wires are or become guided in a positionally accurate manner via the recesses of the clamping ring. By means of the clamping ring, the phase connection wires are retained and/or fixed in the desired, predetermined or correct position. The position of the phase connection wires in the recesses of the clamping ring can be practically freely selected.

In an advantageous embodiment, the recesses of the clamping ring are in the form of radial grooves which are open toward the stator carrier. In a suitable manner, the clamping ring has a radial annular portion and an axial annular portion. The axial annular portion, which is directed in particular toward the stator, is formed radially on the exterior of the radial annular portion. The radial annular portion has an annular opening for the stator carrier and the recesses for the phase connection wires.

In a particularly advantageous manner, the clamping ring has two mutually joinable or joined half-rings. Advantageously, only one of the two half-rings has the recesses for the phase connection wires. This readily allows the clamping ring to be placed in a radial direction on the stator carrier or the clamping ring to be mounted on the stator or stator carrier radially at two sides. The half-ring which is provided with the recesses is placed in this case over the phase connection wires which are arranged in a circumferential direction of the stator carrier in a substantially semicircular manner or which are axially positioned.

According to a suitable variant of the clamping ring, it is in the form of a circular arc with a central angle greater than 180° and less than or equal to 225°, preferably less than 220°, in particular 216°. In this embodiment, the clamping ring which extends over more than 180°, preferably over ⅗ of the circle circumference of the stator carrier, enables a reliable snap-fit on the stator carrier or a sufficient snap-in function for a reliable retention on the stator carrier.

The phase connection wires are guided in a suitable manner on the side, which faces away from the stator, of the clamping ring in a radially orientated joining and/or contacting position or can be bent into this position. As a result of the reliable positioning of the phase connection wires by means of the clamping ring, the phase connection wires can readily and advantageously be brought into the desired position and orientation in an automated or fully automatic manner and preferably fixed at that location.

Advantageously, six phase connection wires or three phase connection pairs are provided. The phase connection wires are radially orientated by means of the connection adapter and orientated in the grid provided, preferably with equidistant mutual spacing. As a result of the opening grid, which preferably extends tangentially relative to the stator carrier and the rotor shaft (rotation axis), of the wire openings of the connection adapter, the phase connection wires which are radially orientated by means of this adapter are orientated in a line, which is parallel with the plane of the printed circuit board and which extends transversely relative to the rotation axis beside each other and with spacing from each other.

The advantages which are afforded with the invention involve particularly the phase connections being orientated in a line via a defined locking dimension as precisely as possible relative to each other by means of the wire or connection adapter which is referred to below as an adapter for short as start and end wires of the stator or rotary winding or the coils which form them with the shortest possible spacing from the printed circuit board. It is thereby again possible, particularly instead of slots, to provide in the printed circuit board (perforated) holes for the phase connection wires. Furthermore, the assembly of the printed circuit board can be carried out via only one joining direction (plane) instead of two joining directions.

Via the adapter which is preferably in the form of a plastics component, the (phase connection) wires are protected in a particularly reliable manner relative to each other, particularly also for transport purposes, with regard to an undesirable bending. Furthermore, the complexity for the component handling, for transport packaging and where applicable for adjusting processes before the installation in the drive or gear mechanism housing is reduced. Via a tongue and groove or plug type construction of the adapter for the drive or gear mechanism housing, the (phase connection) wires are orientated in a particularly advantageous manner with respect to the height relative to the printed circuit board by a short tolerance chain being achieved. As a result of a lateral inclined introduction member which is advantageously provided on the adapter, the stator/rotor subassembly can be radially orientated during joining in the drive or gear mechanism housing, which substantially improves the assembly process with regard to the orientation complexity and a high level of robustness.

Following the joining of the stator/rotor subassembly in the drive/gear mechanism housing, the stator carrier which is in the form of a stator bush can be radially and axially secured via a positive-locking connection following the integrated, peg-like joining element of the adapter being pressed in through a provided hole or joining opening in the gear mechanism housing—and in the electronic compartment there—and a hole or joining opening in the hollow-cylindrical stator carrier (stator bush). The pressing-in forces of the stator carrier into the drive/gear mechanism housing can thereby be reduced and the permitted component tolerances in the press-fit between the stator carrier and the gear mechanism housing can be increased. This again improves the robustness of the construction of the drive apparatus.

When the claim language recites a positive or form-locking connection, it is a connection that connects two elements together due to the shape of the elements themselves (e.g. ball and socket), as opposed to a non-positive or force-locking connection, which locks the elements together by force external to the elements (e.g. screw).

Other features which are considered as characteristic for the invention are set forth in the appended claims.

Although the invention is illustrated and described herein as embodied in a drive device having a brushless electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
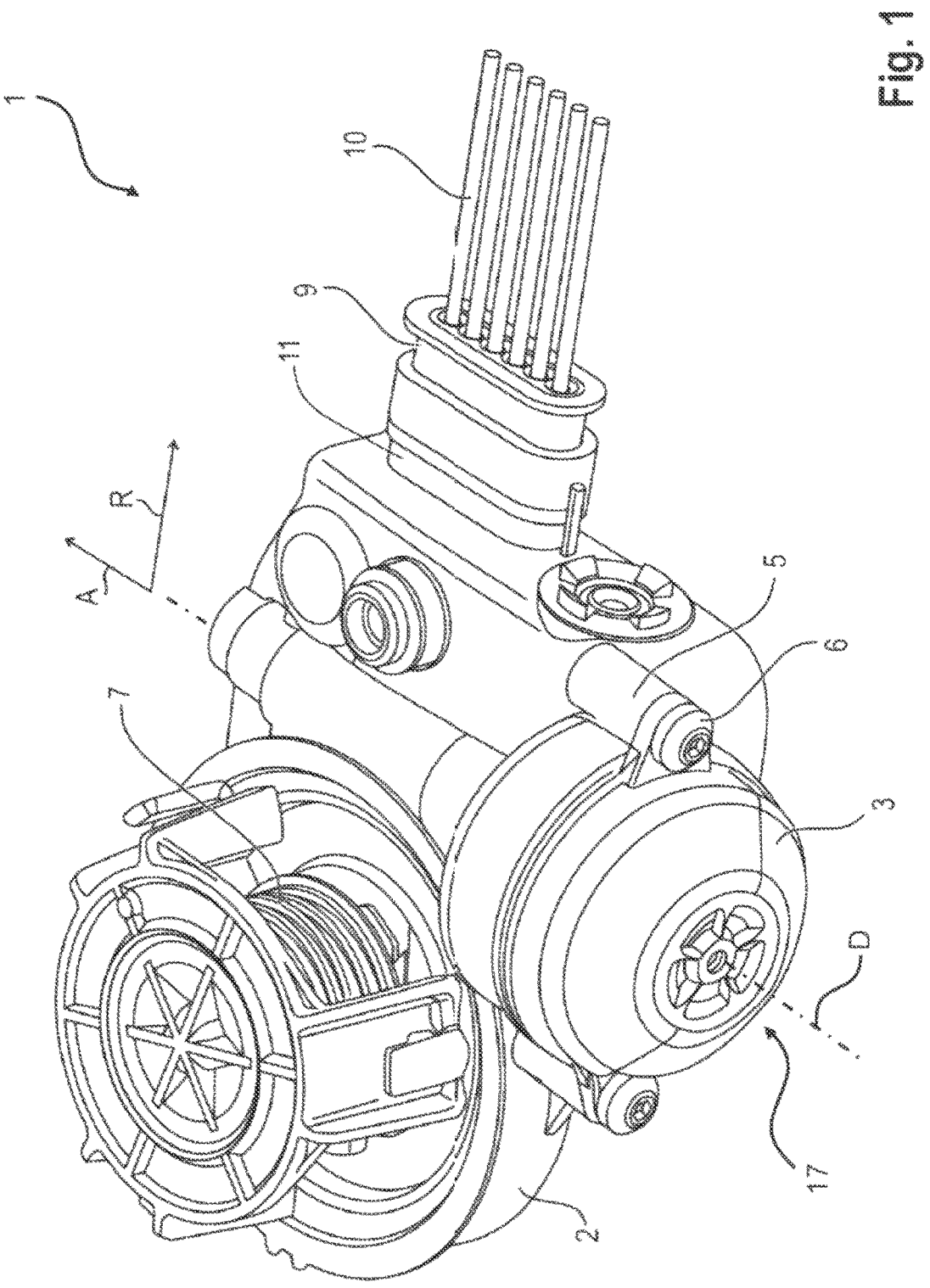
FIG. 1 is a perspective view of a drive apparatus with a drive or gear mechanism housing and an electric motor received therein for driving a cable drum as an output element of an adjusting device, in particular a window lifting mechanism, of a motor vehicle.

Mutually corresponding components are indicated in all the Figures with the same reference numerals.

Figure 2:
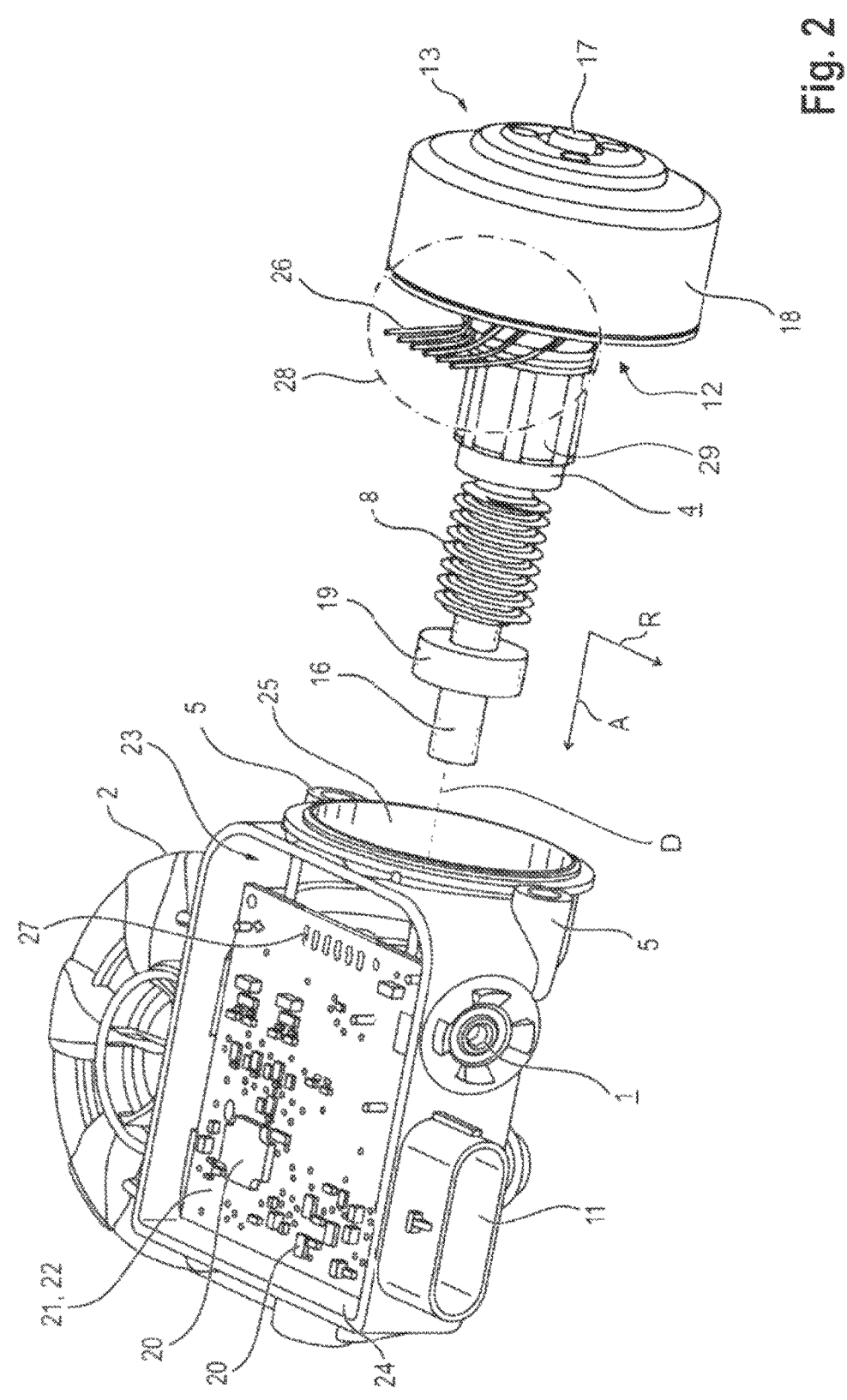
FIG. 2 is an exploded, perspective view of the drive apparatus according to FIG. 1 with an integrated electronic motor unit and with the electric motor with phase connection wires (phase connections) of a stator winding in a preassembly position before the stator/rotor subassembly of the electric motor is introduced into the drive or gear mechanism housing.

Referring now to the figures of the drawings in detail and first, particularly to FIGS. 1 and 2 thereof, there is shown an electromotive drive apparatus 1 having a drive housing which is formed by a gear mechanism housing 2 and a motor housing 3 and in which an electric motor 4 (FIG. 2) is inserted at least partially. The gear mechanism housing 2 and the motor housing 3 are releasably connected to each other by means of a flange connection 5, preferably screwed with flange screws 6. The electric motor 4 drives a cable drum 7 as an output element via a gear mechanism in the exemplary embodiment.

The gear mechanism of the drive apparatus 1 is a 90° redirecting gear mechanism, in particular a worm or spur gear mechanism (spur gear/worm gear mechanism). The worm gear (not visible) thereof which is arranged in the gear mechanism housing 2 and which is connected to the cable drum 7 for a pulling cable particularly of a window lifting mechanism of a motor vehicle meshes with a worm 8 which is driven by the electric motor 4 (FIG. 2). A connection plug 9 with connection lines 10 for current and voltage supply to the drive apparatus 1 which acts as an adjusting drive of the motor vehicle and for supplying and/or discharging control and/or sensor signals is inserted in a connection receiving member 11 on the housing.

FIGS. 1 and 2 indicate the axial direction A and the radial direction R by means of arrows. Furthermore, the rotation or shaft axis, which is depicted with dot-dash lines in FIGS. 1 and 2, of the rotor shaft 11 is designated D.

Figure 11:
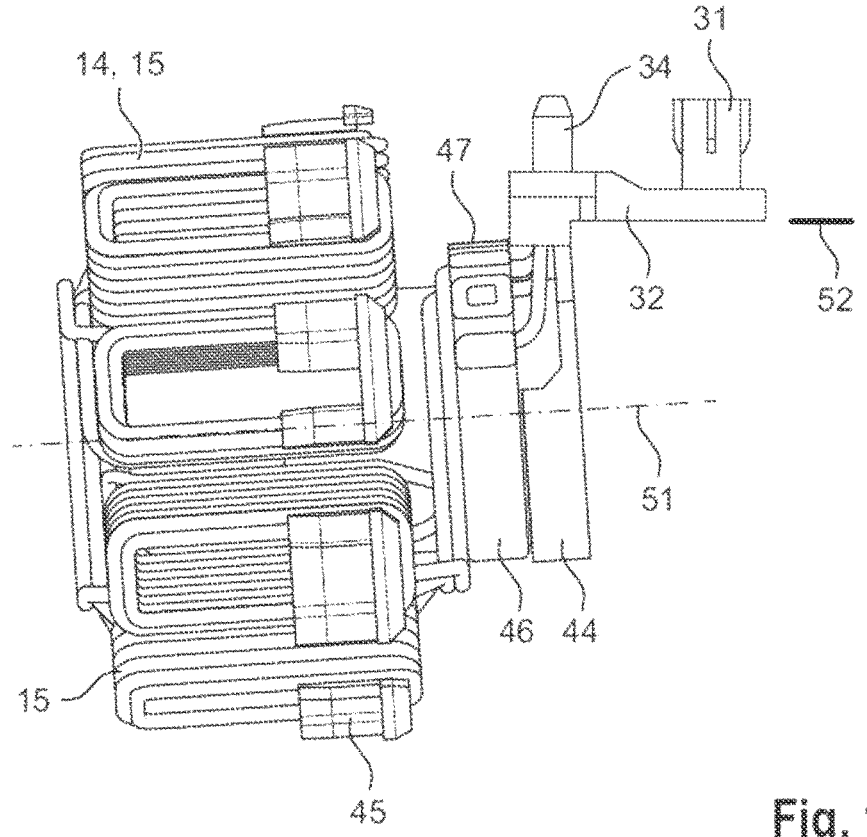
FIG. 11 is a side view of the stator winding which is formed from coils and the grooved box insulation with a formed-on cap portion and a connection adapter which is placed thereon, in a configuration with caulking knobs and with a fixing ring or annular portion which engages round the cap portion.
Figure 12A:
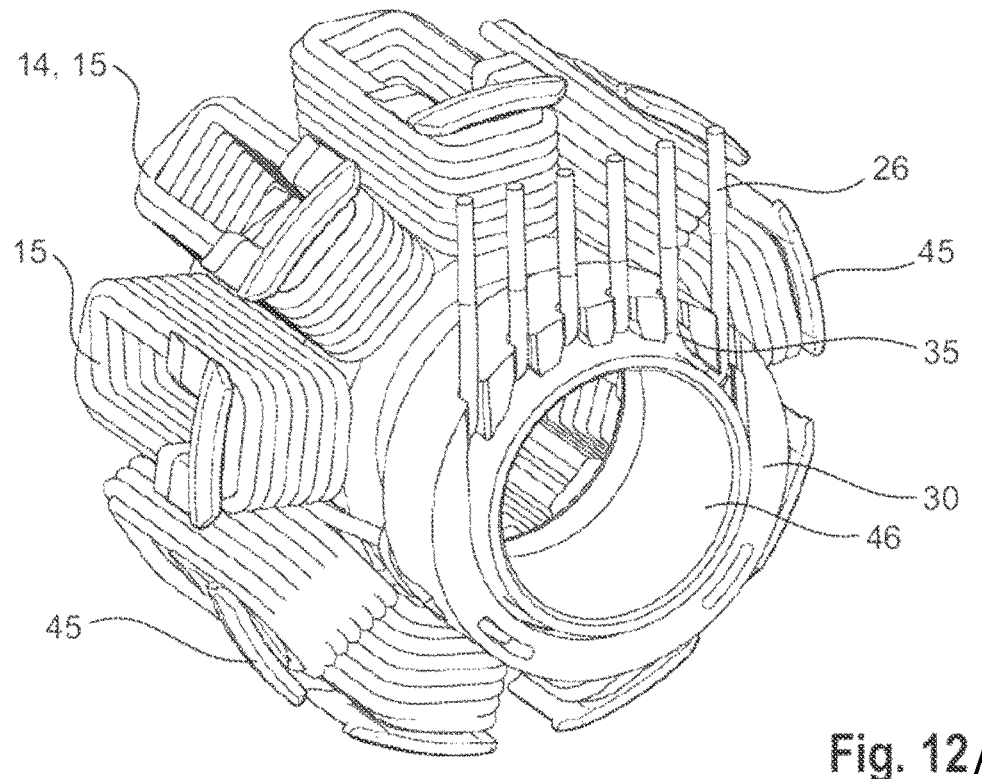
FIG. 12A is a perspective view of the stator winding which is formed from coils and the grooved box insulation with a formed-on cap portion and a connection adapter which is placed thereon, in an alternative configuration with slotted wire or clamping openings for the phase connection wires of the stator winding in a fixing ring which engages round the cap portion of the grooved box insulation (annular portion)
Figure 16:
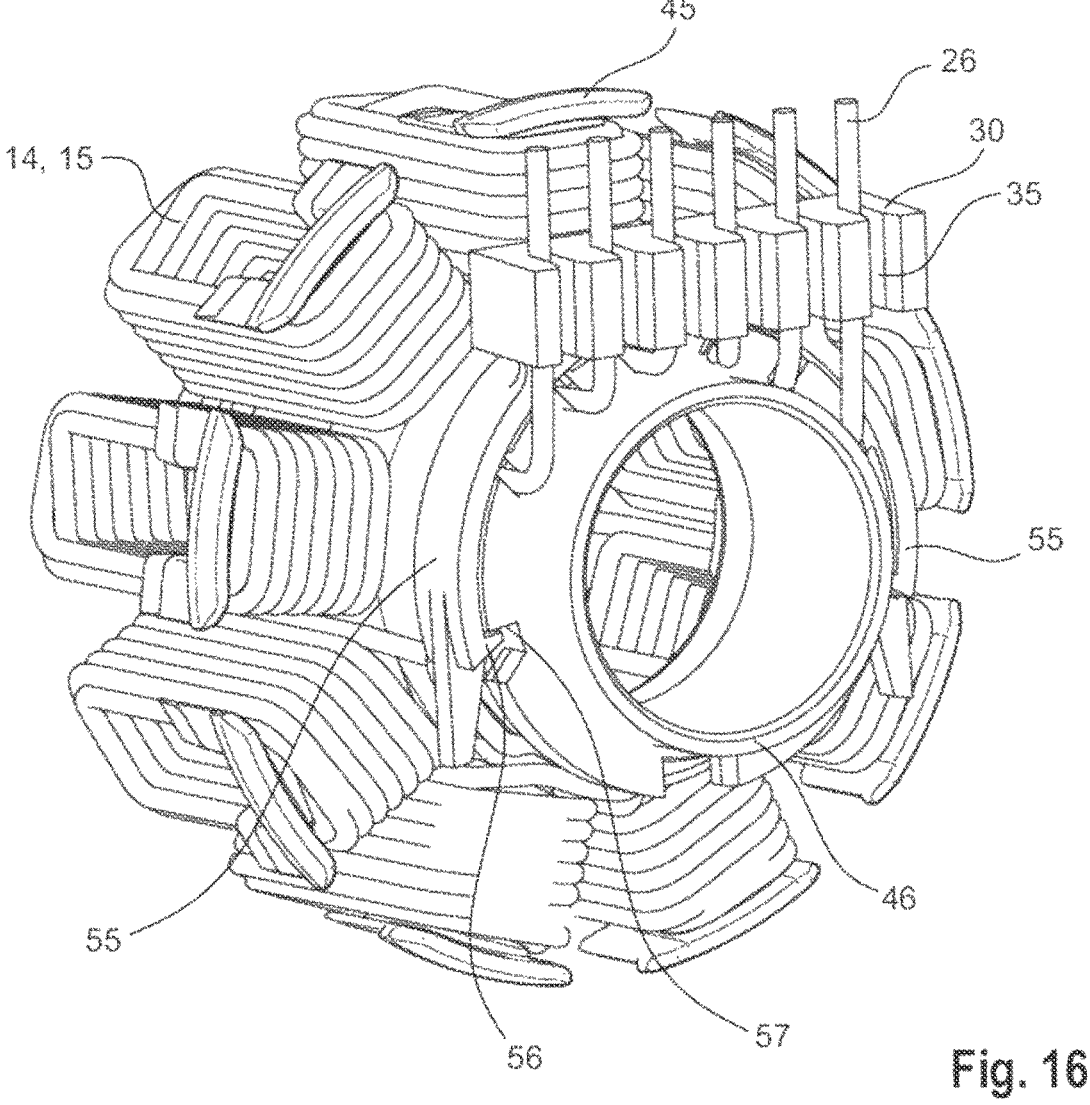
FIG. 16 is a perspective view of the configuration of the connection adapter according to FIG. 15 in an assembly position which is locked to the cap portion of the grooved box insulation.

As can be seen in FIG. 2 with the motor housing 3 removed, the electric motor 4 has a stator 12 which is not illustrated in greater detail and a rotor 13 which is formed by permanent magnets. The stator 12 carries a stator or rotary field winding 14 (FIG. 3) which is formed by coils (individual and/or double coil) 15 (FIGS. 11, 12a and 16). In a manner not illustrated in greater detail, they are wound or positioned on stator teeth, which are directed in a star-like manner radially outwardly, of a stator base member, which is particularly in the form of a metal sheet assembly and which is not illustrated in greater detail, of the stator 12. A motor shaft (rotor shaft) 16 is supported on a bearing location 17, which is preferably in the form of an axial bearing, or is located therein, in the motor housing 3 which is in the form of a housing cover. The permanent magnets of the rotor 13 are arranged at the inner wall in a pot-like housing (rotor housing) 18, wherein the rotor housing 18 with the permanent magnets surrounds (encloses) the stator 12 or the stator base member thereof which carries the rotary field winding 14 so as to form an air gap. The housing 18 is connected in a rotationally secure manner to the rotor or motor shaft 16 via a shaft journal and consequently rotates inside the motor housing or housing cover 3 about the stator 12, which is fixed in the gear mechanism housing 2, of the brushless electric motor 4 which is consequently in the form of an external rotor motor.

There is further positioned in a manner fixed to the shaft on the rotor shaft 16, which carries the worm 8 which meshes with the worm gear (not visible) of the gear mechanism in the assembled state, a magnetic signal transmitter (magnet wheel) 19 which cooperates contactlessly with a magnetic sensor (not visible), for example, a Hall sensor, in order to determine or establish the speed and the rotation direction of the rotor shaft 16 of the rotor 13.

A printed circuit board 21, which is provided with electronic and/or electric structural elements 20, of an electronic motor unit 22 is located inside the gear mechanism housing 2. The printed circuit board 21 is arranged in an electronic unit 23, which can be closed with a cover (not shown), of the gear mechanism housing 2 or can be inserted into the electronic compartment 23 which is accessible via a compartment or housing opening. This electronic compartment is closed by means of the housing cover which is not illustrated here following the assembly of the printed circuit board 21 of the electronic motor unit 22.

Advantageously before the assembly of the printed circuit board 21, the electric motor 4 (this means here and below the stator/rotor subassembly which is formed by the stator 12 with the rotary field winding 14 and the rotor 13 including the rotor shaft 16) is pushed, introduced or inserted into a substantially hollow-cylindrical housing shaft 25 of the gear mechanism housing 2 via a housing opening which is not described in greater detail. The printed circuit board 21 is mounted—with respect to the depicted axial direction A and radial direction R—in the electronic compartment 23 of the gear mechanism housing 2 with radial spacing from the rotor shaft (motor shaft) 16. In this position, the magnet wheel 19 is accordingly positioned relative to the magnetic sensor as one of the components or structural elements 20 for the contactless speed and rotation direction identification of the rotor shaft (motor shaft) 16 of the electric motor 4.

The rotary field winding 14 with the coils 15 thereof has in the exemplary embodiment six phase connection wires 26 which are electrically contacted, in particular soldered, with respect to connection locations 27 of the printed circuit board 21 in the form of perforated connection receiving members or holes. The phase connection wires 26 are radially orientated here in three phase connection pairs, which are schematically enclosed with the dot-dash circle 28, and orientated in a line. The phase connection wires 26 are arranged so as to extend parallel with each other at the end portions thereof provided for the joining connection or for contacting with respect to the printed circuit board 21 and, to this end, bent radially into the correct joining position.

The stator base member which is preferably in the form of a punched/bundled metal sheet stack is located securely on a hollow-cylindrical stator carrier 29 which is also referred to below as a stator bush and via which or by which the rotor shaft 16 is guided. In a manner not illustrated in greater detail, a radial bearing for the rotor shaft 16 is advantageously located inside the stator bush 29.

Figure 3:
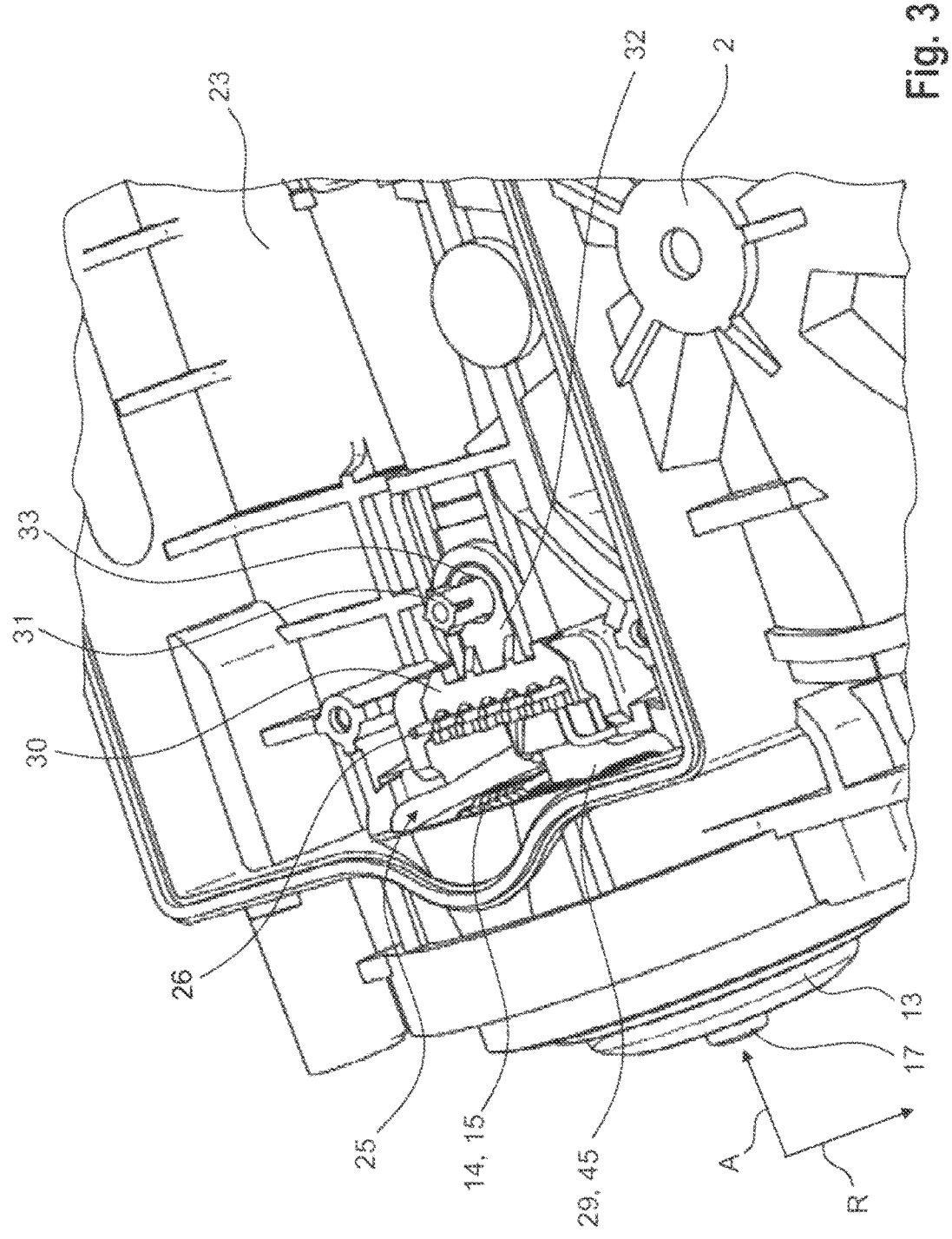
FIG. 3 is a cutout, perspective view of the drive or gear mechanism housing in a viewing direction into an electronic compartment and toward a connection adapter with phase connection wires which are received therein and which are orientated radially and orientated in a line, and with an assembly peg as a joining element in an initial position.

FIG. 3 shows as a cutout the drive or gear mechanism housing which is referred to below simply as a gear mechanism housing 2 in a viewing direction into the electronic compartment 23 and, at that location, specifically at a transition or at a housing interface between the electronic compartment 23 and the housing shaft 25 with a stator/rotor subassembly, which is inserted therein, of the electric motor 4. It is possible to see at this interface a connection adapter 30 which is also referred to below simply as an adapter and which is arranged at the mentioned interface and, at that location, is positioned, preferably in a positive-locking manner in a housing contour. The phase connection wires 26 are received in the adapter 30. This means that, by means of the adapter 30, the phase connection wires 26 of the stator or rotary field winding 14 are orientated with respect to the rotation axis D or axial direction A radially (in a radial direction R). Furthermore, by means of the adapter 30, the phase connection wires 26 or the wire ends thereof are orientated in a predetermined grid in a tangential line (plane) which is tangential with respect to the slightly circular cross section of the housing shaft 25.

The adapter 30 has a joining element 31 which is referred to below as an assembly peg. It is located in the exemplary embodiment on or in an extension arm 32 of the adapter 30. The assembly peg 31 is in this instance retained in a preassembly position on the adapter 30 or on or in the extension arm 32 via a desired breaking location 33.

Figure 4:
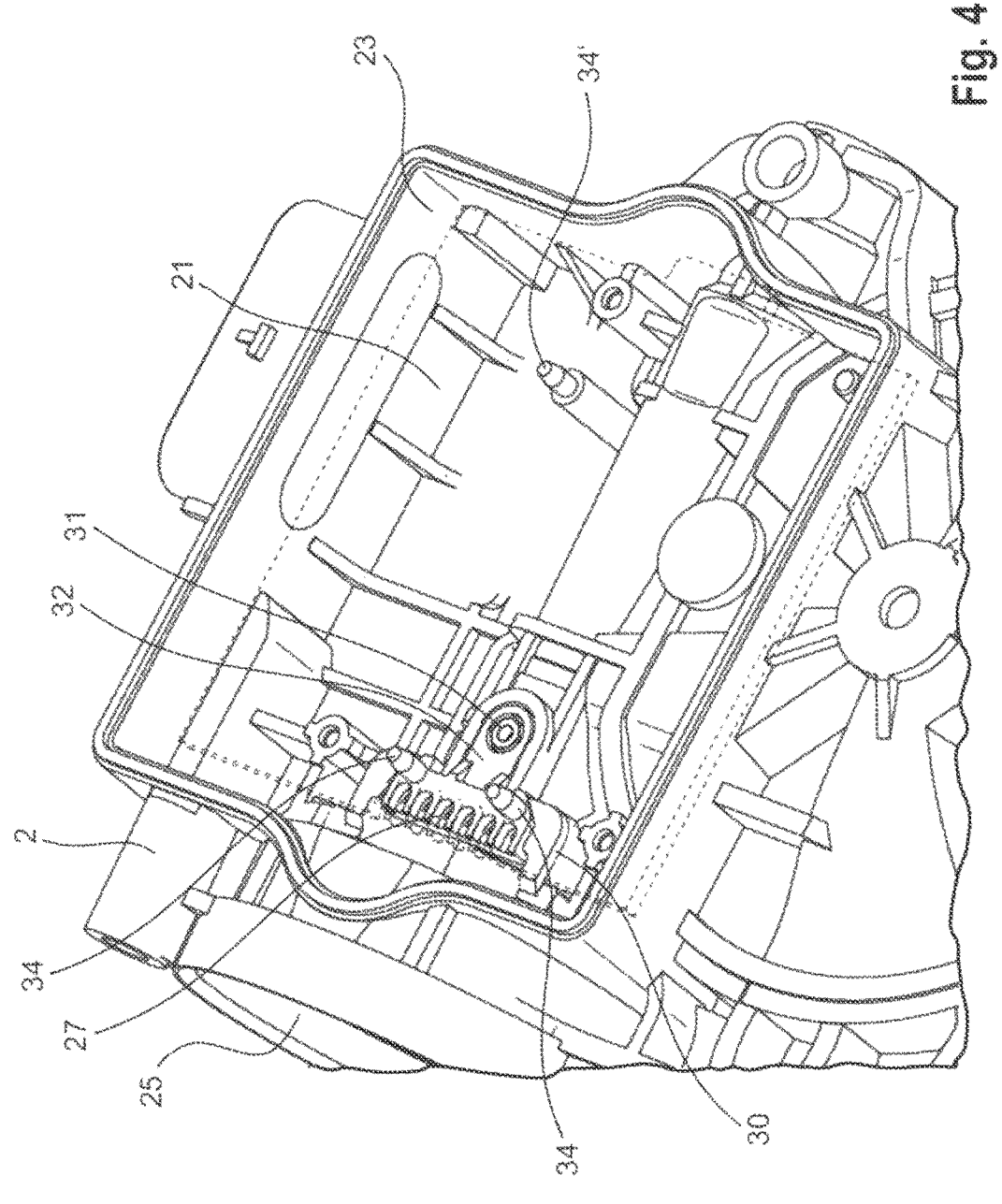
FIG. 4 is a cutout, perspective view according to FIG. 3 of the installation position of the connection adapter with a pressed-in assembly peg in a viewing direction through a printed circuit board which is received in the electronic compartment and which is illustrated in a transparent state by means of the dot-dash external contours.

FIG. 4 shows as an illustration which is similar to FIG. 3, again as a cutout, the gear mechanism housing 2 in a viewing direction into the electronic compartment 23 with a printed circuit board 21 inserted therein. It is illustrated in a transparent state and depicted with dot-dash lines. The adapter 30 which has in this embodiment two radial caulking knobs 34 can be seen. An additional caulking knob 34', which is formed-on in the electronic compartment 23 at the bottom, is also used in addition to the caulking knobs 34 on the adapter to position and/or fix the printed circuit board 21 in the gear mechanism housing 2 by the caulking knobs 34, 34' being deformed or caulked (in the cold or warm state).

The adapter 30 which is shown here without the phase connection wires 26 is fixed in the assembly position shown in the gear mechanism housing 2 and at that location in the electronic compartment 23. To this end, the assembly peg 31 is pressed in a radial direction R into a corresponding opening (not visible) in the base of the housing compartment 23.

Figure 5:
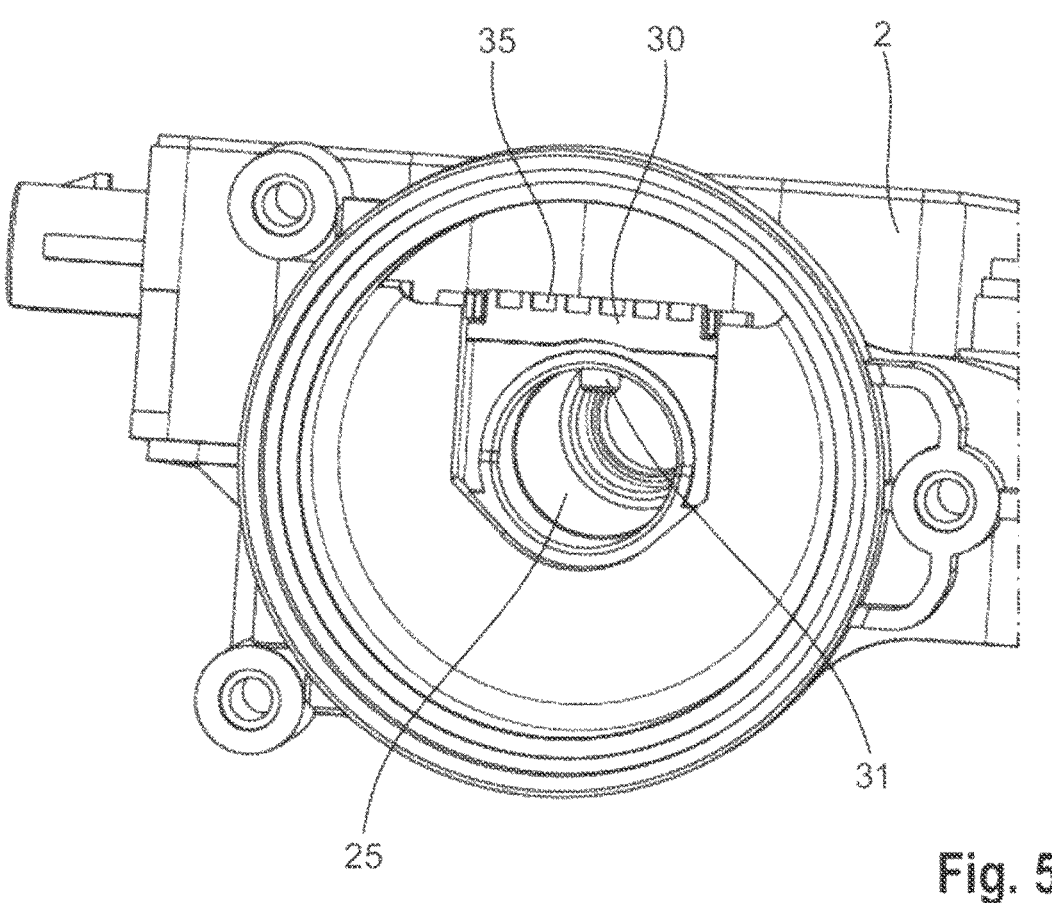
FIG. 5 is a cutout, perspective view of the drive or gear mechanism housing in a viewing direction into a housing shaft for the stator/rotor subassembly with a connection adapter which is arranged on the housing with a pressed-in assembly peg.

This joining or fixing state of the adapter 30 in the gear mechanism housing 2 is illustrated in FIG. 5. As can be seen, the pressed-in assembly peg 31 projects into the housing shaft 25 and is in this instance also introduced through a corresponding opening or hole in the stator carrier (stator bush) 29 in a manner not illustrated in greater detail.

Figure 6:
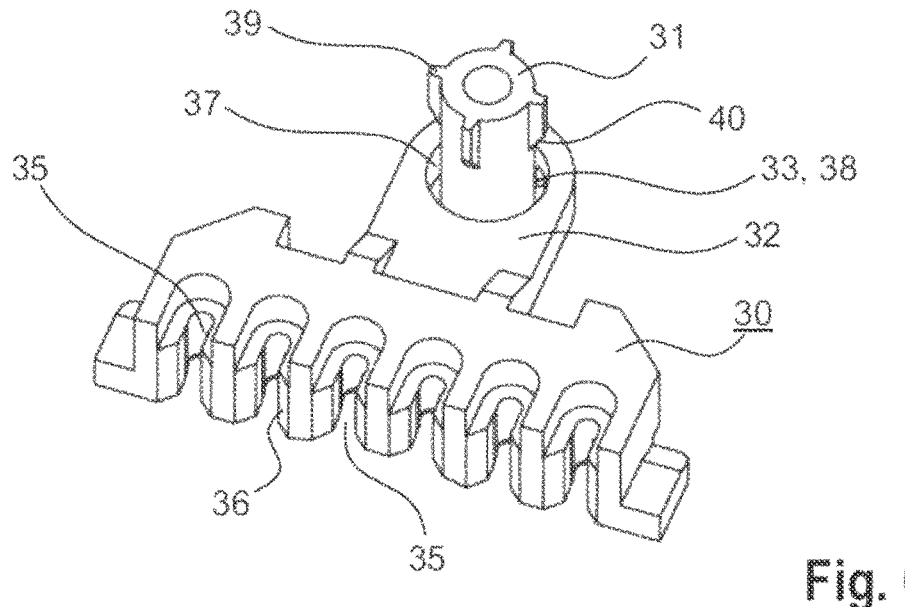
FIG. 6 is a perspective view of the connection adapter with slotted wire or clamping openings for the phase connection wires of the stator winding.
Figure 7:
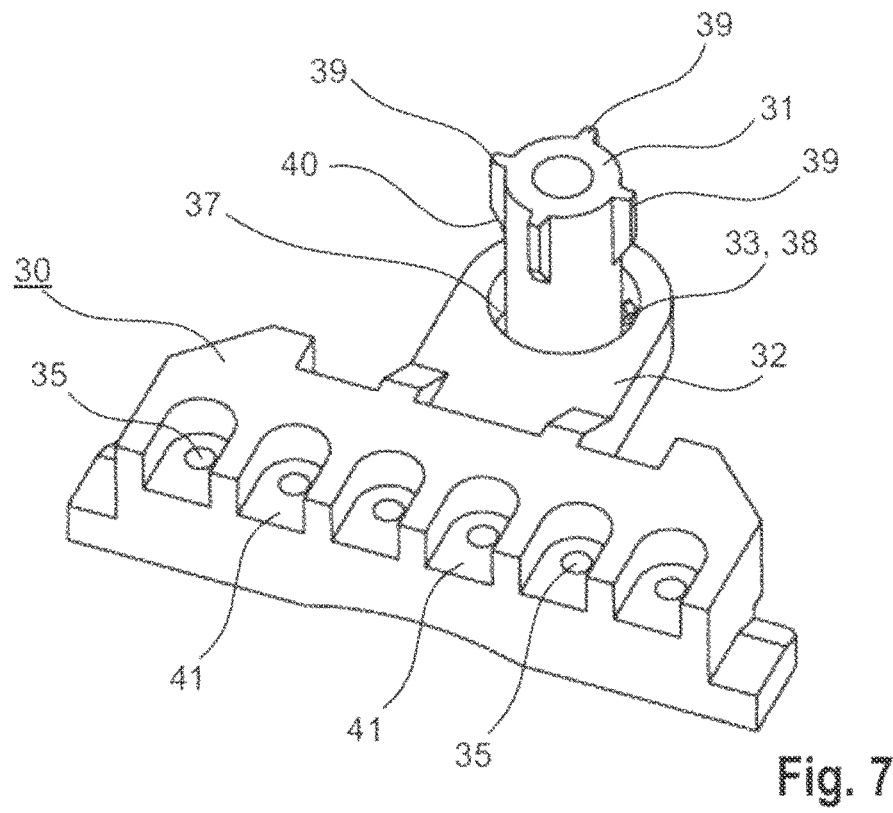
FIG. 7 is a perspective view according to FIG. 6 of the connection adapter with perforated wire openings for the phase connection wires of the stator winding.
Figure 8:
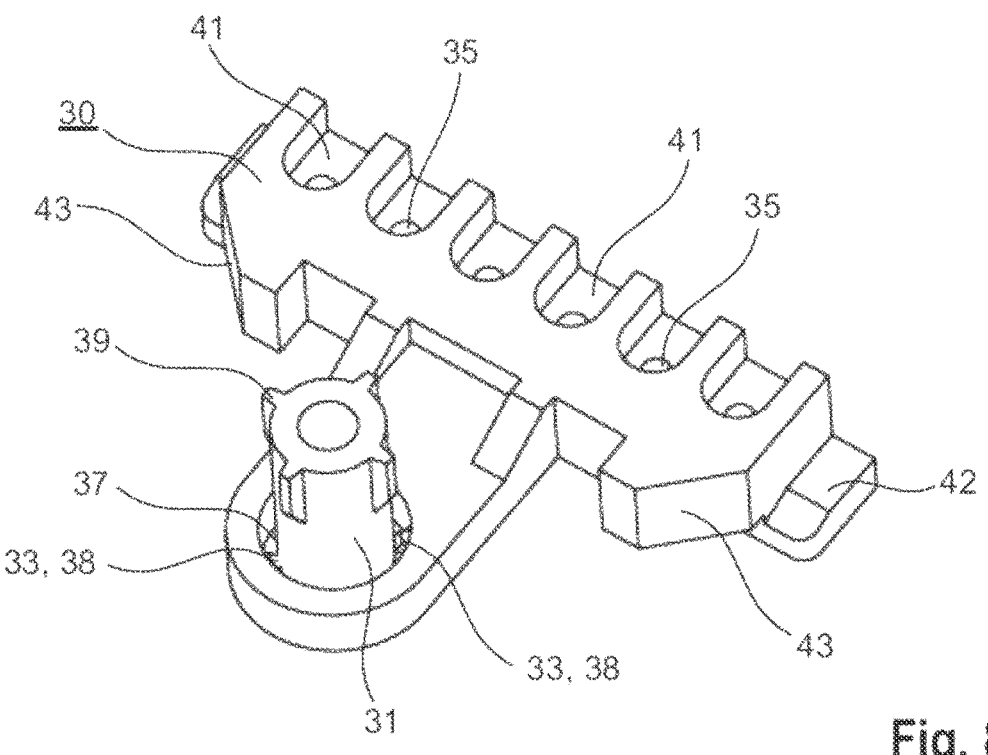
FIG. 8 is a perspective view of the connection adapter according to FIG. 6 or 7 with an inclined introduction member and with a joining flap as a rear engagement or undercut in the gear mechanism housing.

FIGS. 6 to 8 show embodiments of the connection adapter 30. The connection adapter 30 according to FIG. 6 has a number, corresponding to the number of phase connection wires 26, of slotted wire openings 35. By means of this adapter 30, the phase connection wires 26 can be introduced axially into the wire openings 35 and at that location preferably fixed with clamps. To this end, clamping projections or clamping ribs 36 are formed in the wire openings 35 at one side or both sides.

Figure 9:
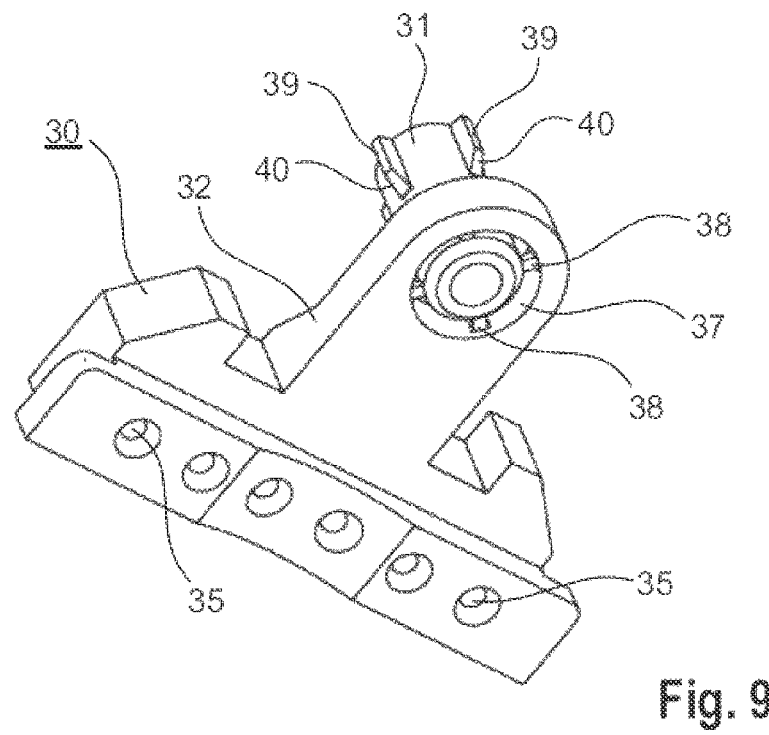
FIG. 9 is a cutout, perspective view of the connection adapter in a viewing direction toward a number of radial webs as a desired breaking location of the assembly peg.

It is comparatively clearly possible to see an opening 37 which is circular in this instance and in which the assembly peg 31 is retained in the preassembly position in the exemplary embodiment via four radial webs (FIG. 9). These radial webs 38 form the desired breaking location 33 and are sized to this end with respect to the strength thereof in such a manner that they break off and the assembly peg 31 can be inserted in a radial direction R during the pressing into the corresponding openings of the adapter 30 or the extension arm 32 thereof and the openings in the electronic compartment 23 and the openings in the stator carrier 29. In the assembly position, the assembly peg 31 is securely retained in the assembly peg 31 in the opening 37 in the adapter, preferably in the manner of a press-fit. To this end, the assembly peg 31 has a number of radial ribs 39, in the exemplary embodiment four. They preferably have inclined introduction or starting members 40.

FIG. 7 shows an embodiment of the connection adapter 30 with wire openings 35 which are in the form of holes. They are located in bead-like or cavity-like channels 41. They are preferably used to improve the solder tin flow path or to improve the spatial relationships with respect to the solder tin during soldering of the phase connection wires 26 at the corresponding connection locations 27 of the printed circuit board 21.

In this embodiment, the connection adapter 30 which is shown in FIG. 8 has a formed-on flap or tongue 42, in particular at least at a narrow side. In the assembled state, it engages under a corresponding contour in the gear mechanism housing 2. The connection adapter 30, which acts as a wire holder, is thereby reliably prevented from becoming detached or rising, particularly when the assembly peg 31 is pressed in or compressed. Furthermore, the connection adapter 30 has, additionally or alternatively, an inclined introduction member 43, in particular at least at one narrow side, for radially orientating the stator/rotor subassembly or the electric motor 4 relative to the gear mechanism housing 2.

Figure 10:
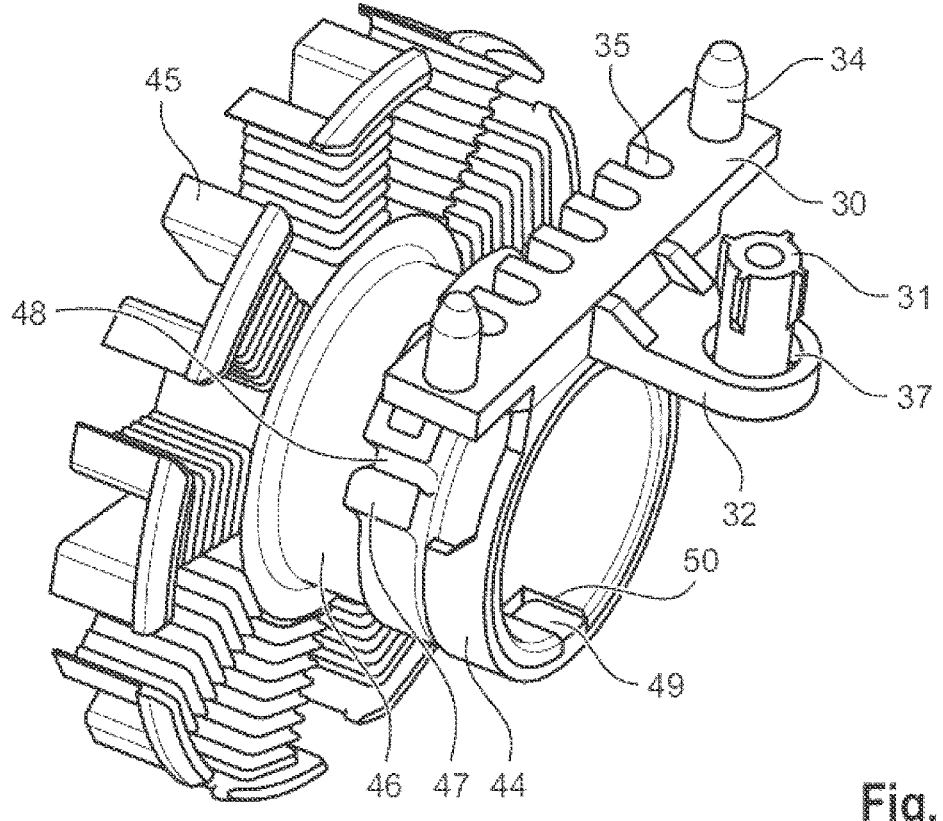
FIG. 10 is a perspective view of the connection adapter with an annular element and a half-shell-like grooved box insulation with a collar-like cap portion for the stator winding (rotary field winding) for a hollow-cylindrical stator carrier (stator bush)

FIG. 10 shows an embodiment of the connection adapter 30 with an annular member or annular portion 44 which is preferably formed on. With this annular portion 44, for example, the adapter 30 can be positioned directly on the cylindrical stator carrier (stator bush 29). In the exemplary embodiment, the adapter 30 is placed on a grooved box or grooved cap insulation 45 by means of the annular portion 44, which is circumferentially closed in this instance, and at that location placed on a formed-on, collar-like (hollow-cylindrical) cap portion 46. This cap portion is passed through by the stator carrier or by the stator bush 29 in the assembled state.

As can be seen in a comparatively clear manner in FIG. 11, the cap portion 46 of the grooved box insulation 45 has radially orientated contours 47 so as to form radial grooves 48. One of the phase connection wires 26 is initially located therein in an axially orientated manner. The annular portion 44 of the adapter 30 of this embodiment has internally a joining contour 49, preferably diametrically relative to the wire openings 35 of the adapter 30. It is located in the inserted state in a corresponding joining groove 50 of the cap portion 46 which is on the grooved box. In this manner, the adapter 30 is retained in this desired or correct position with a tangential orientation on the stator/rotor subassembly or on the electric motor 4.

FIG. 11 further depicts by means of the broken line 51 the parallel state, which extends relative to an inclined position of the stator 12—in this instance, depicted by the individual grooved cap insulation 45 and the coils 15, which are arranged thereon, of the rotary field winding 14—of the printed circuit board 21 as indicated by the line 52.

FIG. 12A again shows the stator 12 which is illustrated simply by the grooved box insulation 45 and the coils 15, which are arranged thereon, of the rotary field winding 14 and which has a different embodiment of the adapter 30 positioned on the cap portion 46 of the grooved box insulation 45.

Figure 12B:
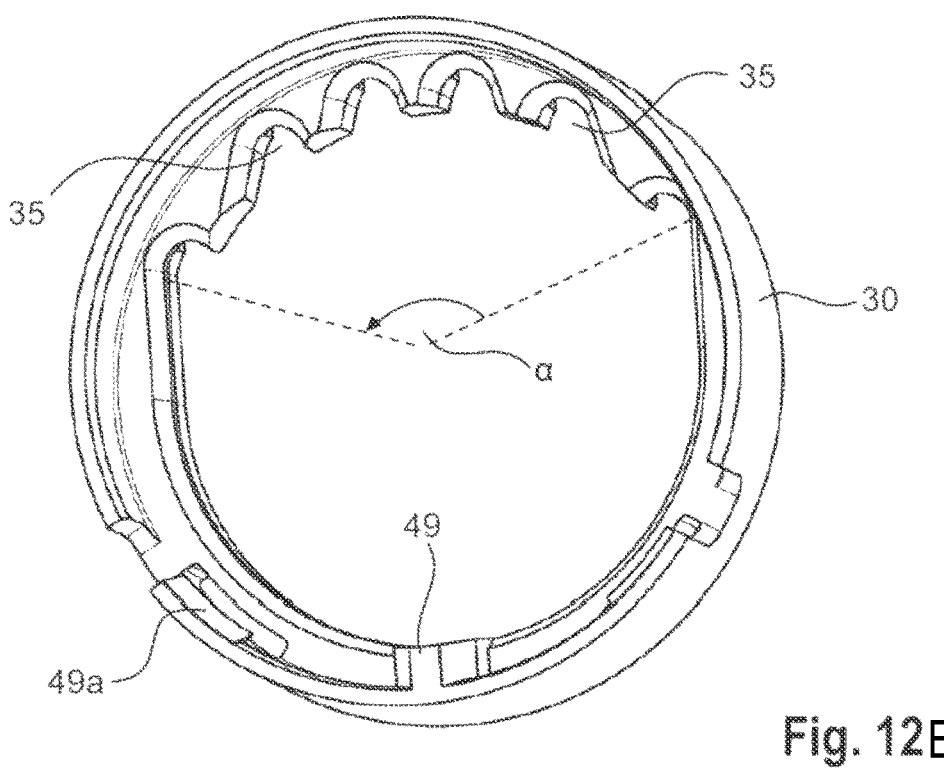
FIG. 12B is a perspective view of the connection adapter according to FIG. 12A as a rear view with a joining contour (for pre-positioning) and a locking element.

As can be seen comparatively clearly in connection with FIG. 12B, the adapter 30 in this embodiment is a substantially L-shaped annular member in cross section with slotted wire openings 35. With respect to the rotation axis D or on the cap portion 46 on the grooved box or on the stator carrier 29, they are in the form of axial grooves which extend through or engage through the annular member in a radial direction R. The adapter 30 of this embodiment can thereby be pushed onto the cap portion 46, wherein the initially axially extending phase connection wires 26 are subsequently bent radially (FIG. 12A).

In this embodiment of the adapter 30, the slotted wire openings (axial grooves) 35 are arranged and constructed along a circular arc with a central angle $\alpha$ of $(130\pm5°)$ so that the phase connection wires 26 are orientated equidistantly relative to each other in the radial orientation thereof. In this embodiment of the adapter 30, the phase connection wires 26 are also bent into the desired radial orientation in or by means of the adapter 30, and orientated in the desired connection grid in a tangential line at the wire ends.

Figure 12C:
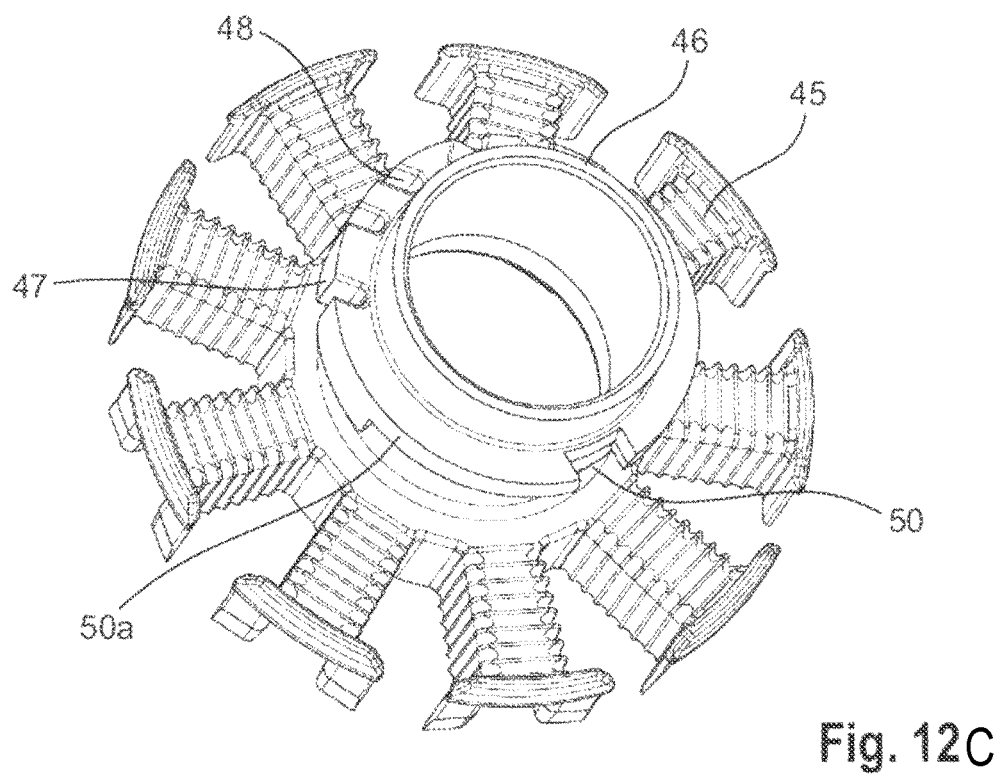
FIG. 12C is a perspective view of the grooved box insulation according to FIG. 12A with, in the cap portion of the grooved box insulation, a locking groove and with a locking contour.

FIG. 12B shows the connection adapter 30 as a rear view again with a joining contour 49 for (pre) positioning and with a locking element 49a. FIG. 12C shows the grooved box insulation 45 according to FIG. 12A with a locking or joining groove 50 which is provided in the cap portion 46 and which corresponds to the joining contour 49 of the adapter 30. The locking element 49a on the adapter corresponds to a locking contour 50a of the grooved box insulation 45 in the region of the cap portion 46. With the adapter 30 which is positioned on the cap portion 46, it locks with respect to the grooved box insulation 45 by the locking element 49a on the adapter engaging over or behind the locking contour 50a on the grooved box (in a positive-locking manner) in the correct position of the adapter 30.

Figure 13:
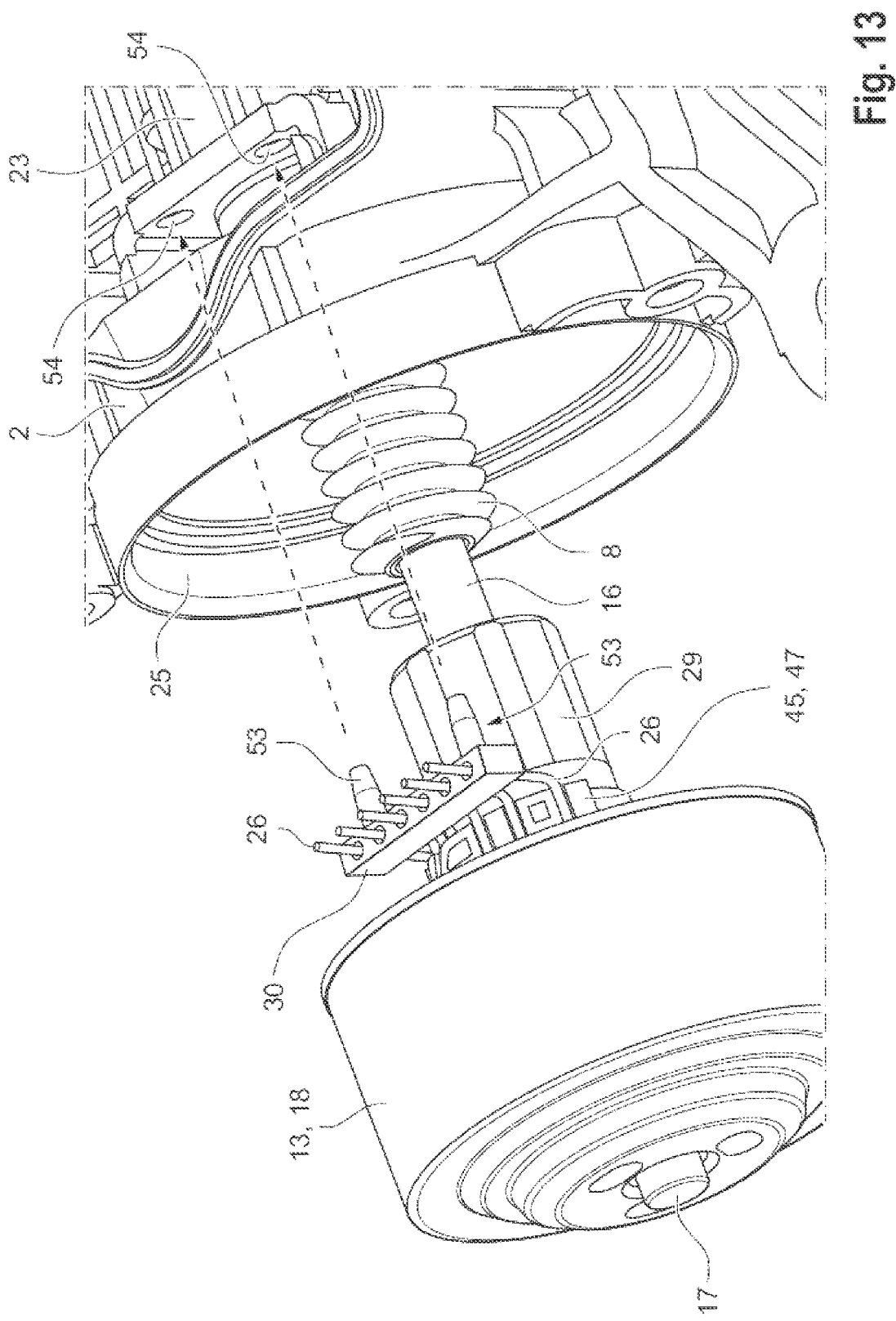
FIG. 13 an exploded, perspective view of the drive or gear mechanism housing with joining or insertion openings at a transition between a gear mechanism shaft for the stator/rotor subassembly and the electronic compartment (base) and with the connection adapter in a configuration with axial joining elements (joining pins) which correspond to the joining or insertion openings.

FIG. 13 shows an embodiment of the connection adapter 30 with the wire openings 35 which are spaced apart beside each other in a tangential line and preferably equidistantly from each other with phase connection wires 26 which are already inserted therein and which are radially bent. In this embodiment, the adapter 30 has two axially orientated joining elements or axial studs 53. They correspond—as indicated by the dot-dash arrows—to insertion openings 54 in the gear mechanism housing and at that location at the transition of the (hollow-cylindrical) housing shaft 25 to the electronic compartment 23 in the region of the compartment base thereof.

With reference to the illustration according to FIG. 13, the stator/rotor subassembly, which is prepared for introduction into the gear mechanism housing 2 and at that location into the housing shaft 25, of the electric motor 4 including the rotary field winding 14 and connection adapter 30, with the phase connection wires 26 which are already inserted therein and which are radially orientated and orientated in the desired grid, can be seen. There is depicted the preassembly position of the stator/rotor subassembly which is intended to be introduced into the gear mechanism housing 2, including the joining elements 52, 53 for fixing the connection adapter 30 with wires which are introduced therein and radially orientated and in the desired grid which is adapted to the connection locations 27 on the printed circuit board.

Figure 14:
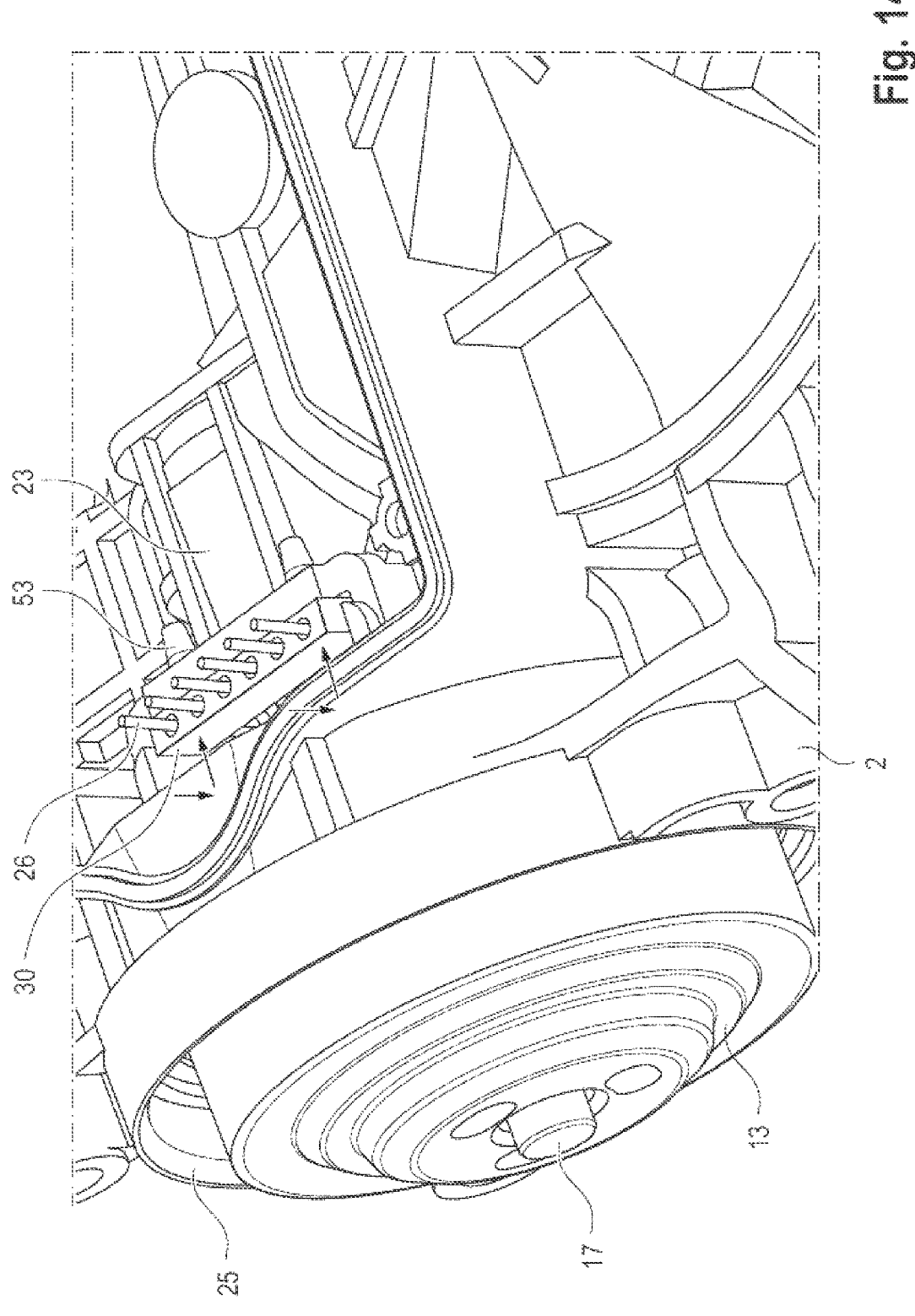
FIG. 14 is a perspective view of the configuration according to FIG. 13 with a stator/rotor subassembly inserted into the housing shaft and a connection adapter which is fixed in position by means of the inserted joining pins.

In the assembled state shown in FIG. 14 with precisely orientated phase connection wires 26, the printed circuit board 21 can now be inserted into the electronic compartment 23 with or in only one individual assembly axis (plane)—in this case, in the radial direction R. In this case, the orientated, radially orientated phase connection wires 26 become inserted virtually automatically into the corresponding connection locations 27 of the printed circuit board 21.

Figure 15:
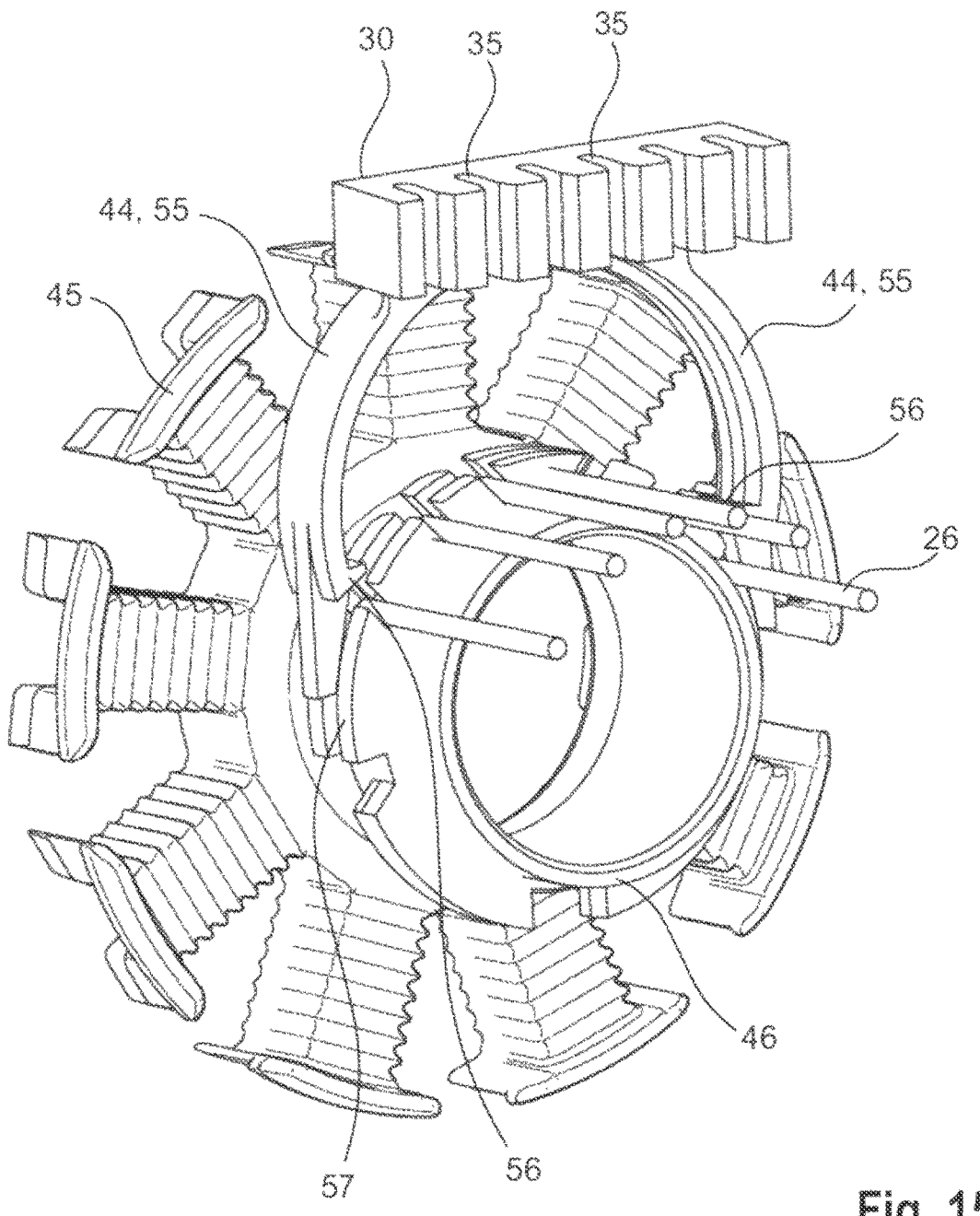
FIG. 15 is a perspective view according to FIG. 10 of the half-shell-like grooved box insulation with a collar-like cap portion and the connection adapter in a configuration with slotted wire openings and a substantially semicircular annular element with locking elements in a preassembly position on the cap portion of the grooved box insulation.

FIGS. 15 and 16 show an additional embodiment of the connection adapter 30 in a preassembly position relative to the grooved box insulation 45 (FIG. 15) or in the final assembly position with phase connection wires 26 which are tangentially orientated in the wire openings 35 of the adapter 30 radially and in the desired grid. For illustration, the phase connection wires 26 are in the initially axial orientation thereof and, following the radial bending, in the desired radial and tangential orientation in the grid provided.

In this embodiment, the adapter 30 again has an annular portion 44. However, it is not circumferentially closed here. Instead, the annular portion 44 is configured from two quarter-circle-like locking arms 55 with locking hooks 56 at the ends. By means of these locking hooks 56, the adapter 30 is locked to the cap portion 46 of the grooved box insulation 45. To this end, corresponding locking contours 57 are formed on the cap portion 46.

Figure 17:
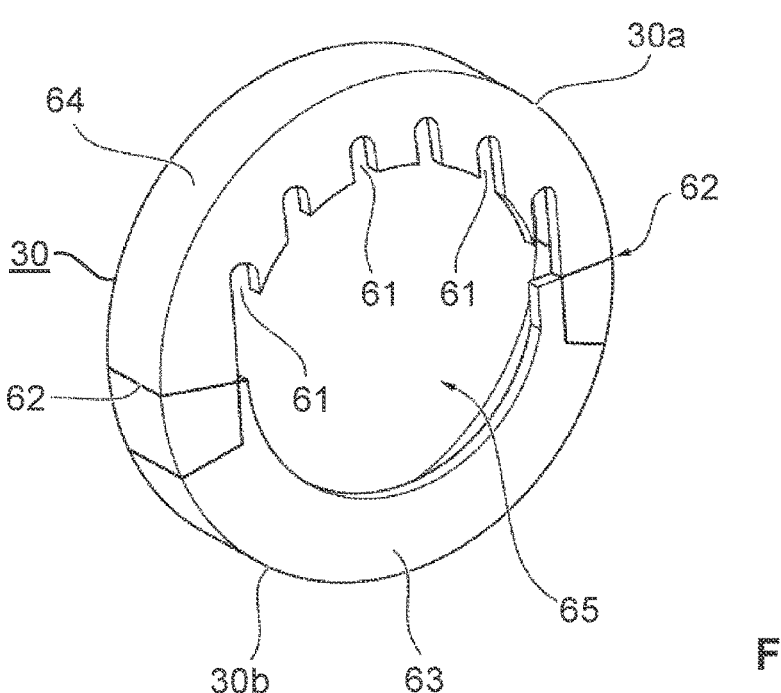
FIG. 17 is a perspective view of a clamping ring as a connection adapter for positioning and/or fixing the phase connection wires at or on the stator carrier.
Figure 18:
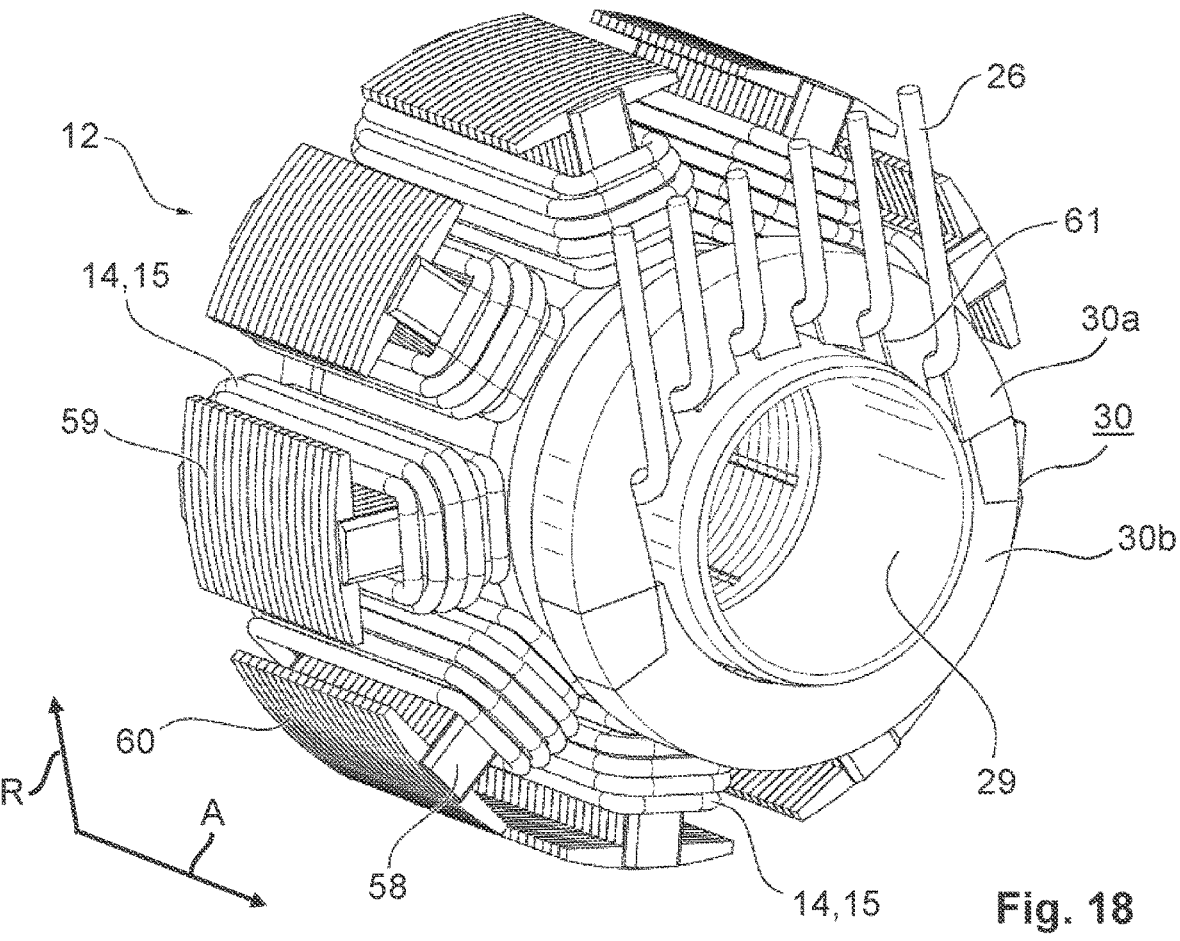
FIG. 18 is a perspective view of the stator with the stator carrier with a clamping ring placed thereon as a connection adapter according to FIG. 1 and with radially orientated phase connection wires.

FIG. 17 shows a clamping ring as a connection adapter 30 for the phase connection wires 26 and FIG. 18 shows the stator 12 with the clamping ring 30 as a connection adapter. The stator 12 has a stator base member 58 which is positioned on the tubular or cylindrical (hollow-cylindrical) stator carrier 29 and which has a number of stator teeth 59 which are arranged in a star-like manner. Via the hollow-cylindrical stator carrier 29, the motor or rotor shaft 16 is guided, that is to say, the stator carrier 29 has a central shaft passage for the rotor shaft 16.

It is possible to see the stator winding 14 which is formed by the individual or double coils 15 which are arranged on stator teeth 60 of the stator 12 or the stator base member 58 thereof. The coil ends form as phase connection wires 26 the phase connections for supplying electric current in the correct phase to the stator winding 14 and are connected in or with the electronic motor unit 22, for example, in a star-like or triangular circuit.

In an initial state, the phase connection wires 26 preferably extend—with respect to the shaft axis of the rotor shaft 16—at least partially in an axial manner, that is to say, in an axial direction A. In this initial state, the phase connection wires 26 are in abutment, preferably directly, against the stator carrier 29 in a semicircular manner or in a circular arc along the circumference thereof, and are pre-positioned in this position and orientation. The phase connection wires 26 can also, particularly only slightly, be spaced apart from the stator carrier 29 (radially). Subsequently, for example, the clamping ring 30 is pushed onto the stator carrier 29 in an axial direction A.

The clamping ring or adapter 30 has a number, corresponding to the number of phase connection wires 26, of recesses 61. Via these recesses 61, the phase connection wires 26 are or become guided on the stator carrier 29 during the positioning of the clamping ring 30, wherein the phase connection wires 26 are or become guided in a positionally accurate manner via the recesses 61 of the clamping ring 30. By means of the clamping ring 30, the phase connection wires 26 are retained and preferably also fixed in the desired, predetermined or correct position.

The recesses 61 of the clamping ring or adapter 30 are in the form of radial grooves which are open toward the stator carrier 29. The clamping ring 30 has two half-rings 30a and 30b which are connected to each other, in particular locked to each other, at joining locations 62 which are radially opposite each other. Only one of the two half-rings, in this case the upper half-ring 30a, has the recesses 61 for the phase connection wires 26. This allows the clamping ring 30 to be positioned in a radial direction R on the stator carrier 29 or it to be mounted radially at two sides. The half-ring 30a which is provided with the recesses 61 is placed in this instance via the phase connection wires 26 which are arranged or axially positioned in a semicircular manner in a circumferential direction of the stator carrier 29.

The clamping ring in the form of a connection adapter 30 has a radial annular portion 63 and an axial annular portion 64 which is formed on the radial annular portion 63 and which is directed toward the stator 12. The radial annular portion 63 has a central annular opening 65, the internal diameter or clear width of which corresponds to the external diameter of the stator carrier 29 so that the clamping ring 30 is positioned in a simple and reliable manner on the stator carrier 29 and is retained thereon, preferably without any play.

The phase connection wires 26 are guided on the side, which faces away from the stator 12 or the stator base member 58 thereof, of the clamping ring 30 in a radially orientated joining and/or contacting position and to this end bent in a corresponding radial manner. As a result of the secure positioning of the phase connection wires 26 by means of the clamping ring or connection adapter 30, the phase connection wires 26 can be brought into the shown position and orientation in an automatic or fully automatic manner.

In the exemplary embodiment, six phase connection wires 26 or three phase connection pairs are provided. The phase connection wires 26 are arranged equidistantly with respect to each other at the circumference of the stator carrier 29 in the circle segment formed by the clamping ring 30 of approximately 135° and in a circumferential direction of the stator carrier 29. In this, preferably radial, orientation, the phase connections 26 can be reliably guided for the electrical contacting thereof on the printed circuit board 21 of the electronic motor unit 22 and can be electrically contacted at that location.

In summary, the invention relates to a drive apparatus 1 having a brushless electric motor 4 having a rotor 13 and having a stator 12 having a stator carrier 29 and having a stator winding 14 with a number of phase connection wires 26. The drive apparatus 1 has a gear mechanism housing 2 having an electronic compartment 23 with a printed circuit board 21 which can be introduced or received therein with connection locations 27 for the phase connection wires 26 and having a housing shaft 25 which is coaxial relative to the rotation axis D or the rotor shaft 16 and in which the electric motor 4 or the stator 12 with the stator carrier 29 and the rotor 13 with the rotor shaft 16, particularly in the form of a stator/rotor subassembly, is received or can be inserted.

A connection adapter 30, in which the phase connection wires 26 are received or introduced or inserted is used to bend and/or orientate the phase connection wires 26 in a radial direction R and to orientate the phase connection wires 26 in a connection grid which is adapted to the connection locations 27 of the printed circuit board 21 and which is particularly tangential. The connection adapter 30 can further act as a transport protection or transport safety member, particularly for the start (winding start) of the stator winding 14 and/or for the coil ends of the coils 15 (end wires).

The invention also relates to a drive apparatus 1 having a brushless electric motor 4 having a rotor 13 and having a stator 12 which has a stator base member 58 which is positioned on a tubular or cylindrical stator carrier 29 and which has a number of stator teeth 59 and stator winding 14 arranged thereon with a number of phase connection wires 26 which extend axially at least partially, and a clamping ring 30 which is positioned on the stator carrier 29 and which is preferably composed of half-rings 30*a*, 30*b* and which has a number of recesses 61, via which the phase connection wires 26 are guided.

The claimed invention is not limited to the above-described exemplary embodiment. Instead, other variants of the invention can also be derived by the person skilled in the art from it in the context of the disclosed claims without departing from the subject-matter of the claimed invention. In particular, all the individual features which are described in connection with the different exemplary embodiments in the context of the disclosed claims can also be combined in other manners without departing from the subject-matter of the claimed invention.

The described solution can also be used not only in the specially illustrated application but also in a similar configuration in other motor vehicle applications, such as, for example, in door and tailgate systems, in vehicle locks, in adjustable seat systems and interior systems, and in other electrical drives.

The following is a summary list of reference numerals and the corresponding structure used in the above description of the invention.

LIST OF REFERENCE NUMERALS

1 Drive apparatus
2 Gear mechanism housing
3 Motor housing
4 Electric motor
5 Flange connection
6 Flange screw
7 Cable drum
8 Worm
9 Connection plug
10 Connection line
11 Connection receiving member
12 Stator
13 Rotor
14 Stator/rotary field winding
15 Coil
16 Motor/rotor shaft
17 Bearing location
18 Rotor/housing
19 Signal transmitter/magnet wheel
20 Structural element
21 Printed circuit board
22 Electronic motor unit
23 Electronic compartment
24 Compartment/housing opening
25 Housing shaft
26 Phase connection wire
27 Connection location/receiving member
28 Circle/phase connection pair
29 Stator carrier/bush
30 Connection/adapter/clamping ring
30*a* Half-ring
30*b* Half-ring
31 Joining element/assembly peg
32 Extension arm
33 Desired breaking location
34 Caulking knobs
35 Wire opening
36 Clamping projection/rib
37 Opening
38 Radial web
39 Radial rib
40 Inclined starting member
41 Channel
42 Flap/tongue
43 Inclined introduction member
44 Fixing ring/annular portion
45 Grooved box insulation
46 Cap portion
47 Contour
48 Radial groove
49 Joining contour
49*a* Locking element
50 Joining groove
50*a* Locking contour
51 Line/inclined position
52 Line/parallelism
53 Joining element/axial stud
54 Insertion openings
55 Locking arm
56 Locking hook
57 Locking contour
58 Stator base member
60 Stator tooth
61 Recess
62 Joining location
63 Radial annular portion
64 Axial annular portion
65 Annular opening
A Axial direction
D Rotation axis
R Radial direction

The invention claimed is:

1. A drive apparatus, comprising:
a brushless electric motor containing a rotor, a rotor shaft connected to said rotor, and a stator having a stator carrier being a bush-shaped or hollow-cylindrical stator carrier and a winding, being a rotary field winding or a stator winding, with a plurality of phase connection wires;
a gear mechanism housing having an electronic compartment and a printed circuit board with connection locations being received or introduced in said electronic compartment, said gear mechanism housing further having a housing shaft being coaxial with respect to a rotation axis of said rotor shaft and in said gear mechanism housing said stator with said stator carrier and said rotor with said rotor shaft being received or inserted; and a connection adapter in which said phase connection wires are orientated radially and being received in a connection grid which is adapted to said connection locations of said printed circuit board; and at least one grooved box insulation associated with said stator and provided as coil or winding members for said stator winding, said grooved box insulation having a collar-shaped cap portion engaging around said stator carrier.

2. The drive apparatus according to claim 1, wherein:

said connection adapter has a plurality of hole-shaped or slot-shaped wire openings; and/or said connection adapter has a plurality of wire openings which are disposed in a connection grid which is orientated tangentially and which is radially spaced apart from said stator carrier; and/or said connection adapter has a plurality of slot-shaped wire openings, which are disposed along a circular arc with a central angle between 100° and 180°.

3. The drive apparatus according to claim 2, wherein:

a number of said hole-shaped or slot-shaped wire openings corresponding to a number said phase connection wires; and/or a number of said slot-shaped wire openings corresponding to a number of said phase connection wires;

said central angle is (130±15)°; and said slot-shaped wire openings are in a form of axial grooves, recesses, or radial grooves.

4. The drive apparatus according to claim 1, wherein:

said gear mechanism housing has a joining opening formed therein; and said connection adapter has at least one joining element which corresponds to said joining opening in said gear mechanism housing.

5. The drive apparatus according to claim 2, wherein a number of said wire openings corresponds to a number of said phase connection wires.

6. The drive apparatus according to claim 4, wherein said at least one joining element is disposed in a region of a transition between said electronic compartment and said housing shaft.

7. The drive apparatus according to claim 1, wherein:

said gear mechanism housing has a joining opening formed therein; and said connection adapter has a plurality of joining elements; or said connection adapter has at least one desired breaking location formed therein and a joining element formed on said at least one desired breaking location, a joining connection is or becomes produced by pressing said joining element on said connection adapter into said joining opening in said gear mechanism housing.

8. The drive apparatus according to claim 7, wherein:

said plurality of joining elements are two, axially orientated, stud-shaped or peg-shaped joining elements; or said joining element is stud-shaped or peg-shaped and is radially orientated.

9. The drive apparatus according to claim 1, wherein:

said connection adapter has radially orientated caulking knobs for fixing said printed circuit board; and/or at least one of said caulking knobs for fixing said printed circuit board is disposed in said electronic compartment of said gear mechanism housing.

10. The drive apparatus according to claim 1, wherein:

said connection adapter has an annular portion which engages partially or completely around said stator carrier; or said connection adapter has an annular portion which partially or completely engages around said collar-shaped cap portion of said grooved box insulation.

11. The drive apparatus according to claim 10, wherein:

said collar-shaped cap portion has a joining groove formed therein and/or locking contours formed thereon; and said annular portion is a closed annular portion of said connection adapter and has a joining contour which corresponds to said joining groove of said collar-shaped cap portion of said grooved box insulation so as to produce a form-locking connection; or said annular portion is a partially closed annular portion of said connection adapter and has curved locking arms with end locking elements which in an assembled state lock at corresponding said locking contours on said collar-shaped cap portion of said grooved box insulation.

12. The drive apparatus according to claim 1, wherein said phase connection wires are six phase connection wires or three phase connection pairs.

13. The drive apparatus according to claim 1, wherein the drive apparatus is a part of a window lifting mechanism.

14. The drive apparatus according to claim 1, wherein the drive apparatus is part of an electromotive adjusting drive of a motor vehicle.

15. The drive apparatus according to claim 1, wherein said stator winding is formed by individual, double or multiple coils.

16. The drive apparatus according to claim 1, wherein the drive apparatus is a part of a cable type window lifting mechanism.

17. A drive apparatus, comprising:

a brushless electric motor containing a rotor, a rotor shaft connected to said rotor, and a stator having a stator carrier being a bush-shaped or hollow-cylindrical stator carrier and a winding, being a rotary field winding or a stator winding, with a plurality of phase connection wires;

a gear mechanism housing having an electronic compartment and a printed circuit board with connection locations being received or introduced in said electronic compartment, said gear mechanism housing further having a housing shaft being coaxial with respect to a rotation axis of said rotor shaft and in said gear mechanism housing said stator with said stator carrier and said rotor with said rotor shaft being received or inserted;

a connection adapter in which said phase connection wires are orientated radially and being received in a connection grid which is adapted to said connection locations of said printed circuit board, said connection adapter having:

a plurality of hole-shaped or slot-shaped wire openings; and/or said connection adapter having a plurality of wire openings disposed in a connection grid orientated tangentially and radially spaced apart from said stator carrier; and/or said connection adapter having a plurality of slot-shaped wire openings, which are disposed along a circular arc with a central angle between 100° and 180°;

said connection adapter further containing a clamping ring having a radial annular portion with an annular opening formed therein for said stator carrier and with recesses formed therein for said phase connection wires and an axial annular portion formed on said radial annular portion and directed toward said stator; and/or said connection adapter having two mutually joinable or joined half-rings.

\* \* \* \* \*